US012793273B2

(12) United States Patent
Bono et al.

(10) Patent No.: US 12,793,273 B2
(45) Date of Patent: Nov. 10, 2026

(54) METHOD OF TRAINING A MODEL FOR A GOAL-ORIENTED VISUAL NAVIGATION TASK

(71) Applicant: NAVER CORPORATION, Seongnam-si (KR)

(72) Inventors: Guillaume Bono, Crolles (FR); Leonid Antsfeld, Saint-Ismier (FR); Boris Chidlovskii, Meylan (FR); Philippe Weinzaepfel, Montbonnot-Saint-Martin (FR); Christian Wolf, Fontaines Saint Martin (FR)

(73) Assignee: NAVER CORPORATION, Seongnam-si (KR)

( * ) Notice: Subject to any disclaimer, the term of this patent is extended or adjusted under 35 U.S.C. 154(b) by 252 days.

(21) Appl. No.: 18/799,633

(22) Filed: Aug. 9, 2024

(65) Prior Publication Data

US 2025/0111543 A1 Apr. 3, 2025

Related U.S. Application Data

(60) Provisional application No. 63/586,004, filed on Sep. 28, 2023.

(51) Int. Cl.

*G06K 9/00* (2022.01)
*B25J 9/16* (2006.01)
*G06T 7/70* (2017.01)
*G06T 9/00* (2006.01)

(52) U.S. Cl.

CPC ............... *G06T 9/00* (2013.01); *B25J 9/1664* (2013.01); *G06T 7/70* (2017.01)

(58) Field of Classification Search

CPC ................................ G06T 9/00; B25J 9/1664
See application file for complete search history.

(56) References Cited

U.S. PATENT DOCUMENTS

| | | | |
|---|---|---|---|
| 10,452,978 B2 | 10/2019 | Shazeer et al. | |
| 12,499,678 B2 | 12/2025 | Brégier et al. | |
| 2024/0144019 A1 | 5/2024 | Weinzaepfel et al. | |

FOREIGN PATENT DOCUMENTS

| | | | |
|---|---|---|---|
| CN | 116188550 A * | 5/2023 | G06T 7/50 |

OTHER PUBLICATIONS

Yan, S., Wang, J., Wu, Z., Tan, M., & Yu, J. (2023). Autonomous vision-based navigation and stability augmentation control of a biomimetic robotic hammerhead shark. IEEE Transactions on Automation Science and Engineering, 21(3), 3319-3331. (Year: 2023).*

Marza P., et al., "Teaching Agents How to Map: Spatial Reasoning for Multi-Object Navigation," International Conference on Intelligent Robots and Systems (IROS) 2022, Oct. 2022, Kyoto, Japan, 9 pages.

(Continued)

*Primary Examiner* — Molly Wilburn
*Assistant Examiner* — Aidan Keup
(74) *Attorney, Agent, or Firm* — Greer, Burns & Crain, Ltd

(57) ABSTRACT

Methods and systems for training a model for a goal-oriented visual navigation task. A binocular encoder is pretrained on one or more pretext tasks wherein one or more layers of the binocular encoder may be adapted by one or more adaptors, and is combined with a navigation policy module in the navigation model. The navigation model is end-to-end trained on a downstream visual navigation task.

22 Claims, 11 Drawing Sheets

(56) References Cited

OTHER PUBLICATIONS

Melekhov, I., et al., “Relative Camera Pose Estimation Using Convolutional Neural Networks,” Advanced Concepts for Intelligent Vision Systems, Lecture Notes in Computer Science, Cham: Springer International Publishing, 2017, 10617, pp. 675-687.
Mezghani, L., et al., “Memory-Augmented Reinforcement Learning for Image-Goal Navigation,” published on arXiv:2101.05181v5, Sep. 12, 2022, 12 pages.
Mirowski, P., et al., “Learning to Navigate in Complex Environments,” ICLR 2017, 16 pages.
Mur-Artal, R., et al., “Orb-Slam: A Versatile and Accurate Monocular SLAM System,” IEEE Transactions on Robotics 31, No. 5, Oct. 2015, pp. 1147-1163.
Parisotto, E., et al., “Neural Map: Structured Memory for Deep Re-Inforcement Learning,” ICLR, 2018, 20 pages.
Pashevich, A., et al., “Episodic Transformer for Vision-and-Language Navigation,” 2021 IEEE/CVF International Conference on Computer Vision (ICCV), Montreal, QC, Canada: IEEE, 2021, pp. 15942-15952.
Radosavovic, I., et al., “Real-World Robot Learning with Masked Visual Pre-Training,” 6th conference on Robot Learning (CoRL), vol. 205, Auckland New Zealand, 2022, 11 pages.
Ramakrishnan, S., et al., “Habitat-Matterport 3D Dataset (HM3D): 1000 Large-Scale 3D Environments for Embodied AI,” 35th Conference on Neural Information Processing Systems Datasets and Benchmarks Track, 2021, 12 pages.
Ramakrishnan, S., et al., “PONI: Potential Functions for ObjectGoal Navigation with Interaction-Free Learning,” 2022 IEEE/CVF Conference on Computer Vision and Pattern Recognition (CVPR), New Orleans, LA, USA: IEEE, 2022, 19 pages.
Reed, S., et al., “A Generalist Agent,” published on arXiv:2205.06175v3, Nov. 11, 2022, 42 pages.
Revaud, J., et al., “R2D2: Repeatable and Reliable Detector and Descriptor,” 33rd Conference on Neural Information Processing Systems (NeurIPS 2019), Vancouver, Canada, 2019, 11 pages.
Rosmann, C., et al., “Timed-Elastic-Bands for Time-Optimal Point-to-Point Nonlinear Model Predictive Control,” 2015 European Control Conference (ECC), Linz, Austria: IEEE, 2015, pp. 3352-3357.
Sarlin, P., et al., “SuperGlue: Learning Feature Matching With Graph Neural Networks,” 2020 IEEE/CVF Conference on Computer Vision and Pattern Recognition (CVPR), Seattle, WA, USA: IEEE, 2020, pp. 4938-4947.
Savva, M., et al., “Habitat: A Platform for Embodied AI Research,” 2019 IEEE/CVF International Conference on Computer Vision (ICCV), Seoul, Korea (South): IEEE, 2019, pp. 9339-9347.
Schulman, J., et al., “Proximal Policy Optimization Algorithms,” published on arXiv:1707.06347v2, Aug. 28, 2017, 12 pages.
Sethian, J. A., “A Fast Marching Level Set Method for Monotonically Advancing Fronts,” Proceedings of the National Academy of Sciences 93, No. 4, Feb. 1996, pp. 1591-1595.
Shah, D., et al., “ViKiNG: Vision-Based Kilometer-Scale Navigation with Geographic Hints,” published on arXiv:2202.11271v2, May 3, 2022, 13 pages.
Singh Chaplot, D., et al., “Neural Topological SLAM for Visual Navigation,” 2020 IEEE/CVF Conference on Computer Vision and Pattern Recognition (CVPR), Seattle, WA, USA: IEEE, 2020, pp. 12875-12884.
Thrun, S., et al., “Probabilistic Robotics,” Intelligent Robotics and Autonomous Agents, Cambridge, Mass: MIT Press, 2005, Chapters 5 and 10, 64 pages.
Wang, Y., et al., “Visual Pre-Training for Navigation: What Can We Learn from Noise?,” NeurIPS 2022 Workshop on Synthetic Data for Empowering ML Research, 2022, 7 pages.
Weinzaepfel, P., et al., “CroCo: Self-Supervised Pre-Training for 3D Vision Tasks by Cross-View Completion,” 36th Conference on Neural Information Processing Systems, 2022, 15 pages.
Wijmans, E., et al., “DD-PPO: Learning Near-Perfect Pointgoal Navigators From 2.5 Billion Frames,” ICLR, 2020, 21 pages.
Wu, Q., et al., “Image-Goal Navigation in Complex Environments via Modular Learning,” published on arXiv: 2108.06105v3, Feb. 22, 2022, 9 pages.
Xia, F., et al., “Gibson Env: Real-World Perception for Embodied Agents,” 2018 IEEE/CVF Conference on Computer Vision and Pattern Recognition, Salt Lake City, UT: IEEE, 2018, pp. 9068-9079.
Xie, Z., et al., “Pretraining in Deep Reinforcement Learning: A Survey,” published on arXiv:2211.03959v1, Nov. 8, 2022, 41 pages.
Xu, M., et al., “A Critical Analysis of Image-Based Camera Pose Estimation Techniques,” published on arXiv:2201.05816v1, Jan. 15, 2022, 77 pages.
Yadav, K., et al., “OVRL-V2: A Simple State-of-Art Baseline for ImageNav and ObjectNav,” published on arXiv:2303.07798v1, Mar. 14, 2023, 15 pages.
Yadav, K., et al., “Offline Visual Representation Learning for Embodied Navigation,” published on arXiv:2204.13226, Apr. 27, 2022, 24 pages.
Yuan, L., et al., “Florence: A New Foundation Model for Computer Vision,” published on arXiv:2111.11432v1, Nov. 22, 2021, 17 pages.
Zhu, Y., et al., “Target-Driven Visual Navigation in Indoor Scenes Using Deep Reinforcement Learning,” 2017 IEEE International Conference on Robotics and Automation (ICRA), Singapore, Singapore: IEEE, 2017, 8 pages.
Vaswani, A., et al., “Attention Is All You Need,” 31st Conference on Neural Information Processing Systems (NIPS 2017), Long Beach, CA, USA, 2017, 11 pages.
Shah, D., et al., “Rapid Exploration for Open-World Navigation with Latent Goal Models,” 5th Conference on Robot Learning (CoRL 2021), London, UK, 2021, 11 pages.
Al-Halah, Z., et al., “Zero Experience Required: Plug & Play Modular Transfer Learning for Semantic Visual Navigation,” 2022 IEEE/CVF Conference on Computer Vision and Pattern Recognition (CVPR), New Orleans, LA, USA: IEEE, 2022, pp. 17031-17041.
Anderson, P., et al., “On Evaluation of Embodied Navigation Agents,” published on arXiv, Jul. 18, 2018, 7 pages.
Balntas, V., et al., “RelocNet: Continuous Metric Learning Relocalisation Using Neural Nets,” Computer Vision—ECCV 2018, 17 pages.
Beeching, E., et al., “EgoMap: Projective Mapping and Structured Egocentric Memory for Deep RL,” Machine Learning and Knowledge Discovery in Databases, Lecture Notes in Computer Science. Cham: Springer International Publishing, 2021, 16 pages.
Beeching, E., et al., “Learning to Plan with Uncertain Topological Maps,” Computer Vision—ECCV 2020, 18 pages.
Bono, G., et al., “End-to-End (Instance)—Image Goal Navigation through Correspondence as an Emergent Phenomenon,” published on arXiv, Sep. 28, 2023, 16 pages.
Brégier, R., “Deep Regression on Manifolds: A 3D Rotation Case Study,” published on arXiv, Oct. 12, 2021, 17 pages.
Bresson, G., et al., “Simultaneous Localization and Mapping: A Survey of Current Trends in Autonomous Driving,” IEEE Transactions on Intelligent Vehicles 2, No. 3, Sep. 2017, 29 pages.
Burgard, W., et al., “The Interactive Museum Tour-Guide Robot,” Proceedings of American Association for Artificial Intelligence, 1998, 8 pages.
Caron, M., et al., “Emerging Properties in Self-Supervised Vision Transformers,” 2021 IEEE/CVF International Conference on Computer Vision (ICCV), Montreal, QC, Canada: IEEE, 2021, pp. 9650-9660.
Chang, A., et al., “Matterport3D: Learning from RGB-D Data in Indoor Environments,” published on arXiv:1709.06158v1, Sep. 18, 2017, 25 pages.
Chaplot, D., et al., “Object Goal Navigation Using Goal-Oriented Semantic Exploration,” 34th Conference on Neural Information Processing Systems, 2020, 12 pages.
Chaplot, D., et al., “Learning To Explore Using Active Neural Slam,” ICLR Conference Paper, 2020, 18 pages.

(56) References Cited

OTHER PUBLICATIONS

Chattopadhyay, P., et al., "RobustNav: Towards Benchmarking Robustness in Embodied Navigation," published on arXiv:2106.04531v1, Jun. 8, 2021, 18 pages.
Chen, K., et al., "Wide-Baseline Relative Camera Pose Estimation with Directional Learning," 2021 IEEE/CVF Conference on Computer Vision and Pattern Recognition (CVPR), Nashville, TN, USA: IEEE, 2021, pp. 3258-3268.
Chen, S., et al., "Think Global, Act Local: Dual-Scale Graph Transformer for Vision-and-Language Navigation," 2022 IEEE/CVF Conference on Computer Vision and Pattern Recognition (CVPR), New Orleans, LA, USA: IEEE, 2022, pp. 16537-16547.
Chen, S., et al., "AdaptFormer: Adapting Vision Transformers for Scalable Visual Recognition," 36th Conference on Neural Information Processing Systems, 2022, 15 pages.
Cho, K., et al., "Learning Phrase Representations Using RNN Encoder-Decoder for Statistical Machine Translation," Proceedings of the 2014 Conference on Empirical Methods in Natural Language Processing (EMNLP), Doha, Qatar: Association for Computational Linguistics, Oct. 2014, pp. 1724-1734.
Das, A., et al., "Embodied Question Answering," Proceedings of the IEEE Conference on Computer Vision and Pattern Recognition (CVPR), 2018, 10 pages.
Das, A., et al., "Neural Modular Control for Embodied Question Answering," 2nd Conference on Robot Learning, Zürich, Switzerland, 2018, 10 pages.
Detone, D., et al., "SuperPoint: Self-Supervised Interest Point Detection and Description," 2018 IEEE/CVF Conference on Computer Vision and Pattern Recognition Workshops (CVPRW), Salt Lake City, UT, USA: IEEE, 2018, pp. 337-349.
Devlin, J., et al., "BERT: Pre-Training of Deep Bidirectional Transformers for Language Understanding," Proceedings of the 2019 Conference of the North American Chapter of the Association for Computational Linguistics: Human Language Technologies, vol. 1 (Long and Short Papers), Minneapolis, Minnesota: Association for Computational Linguistics, 2019, pp. 4171-4186.
Ding, Y., et al., "Goal-Conditioned Imitation Learning," 33rd Conference on Neural Information Processing Systems, Vancouver, Canada, 2019, 12 pages.
Dosovitskiy, A., et al., "An Image is Worth 16X16 Words: Transformers for Image Recognition at Scale," ICLR, 2021, 21 pages.
Du, H., et al., "VTNET: Visual Transformer Network for Object Goal Navigation," ICLR, 2021, 16 pages.
Fang, K., et al., "Scene Memory Transformer for Embodied Agents in Long-Horizon Tasks," 2019 IEEE/CVF Conference on Computer Vision and Pattern Recognition (CVPR), Long Beach, CA, USA: IEEE, 2019, pp. 538-547.
Florence, P., et al., "Self-Supervised Correspondence in Visuomotor Policy Learning," NeurIPS 2019 Workshop on Robot Learning: Control and Interaction in the Real World, Vancouver, Canada, 2019, 11 pages.
Fox, D., W., et al., "The Dynamic Window Approach to Collision Avoidance," 1995 Technical Report, University of Bonn, Aug. 1995, 23 pages.
He, K., et al., "Masked Autoencoders Are Scalable Vision Learners," 2022 IEEE/CVF Conference on Computer Vision and Pattern Recognition (CVPR), New Orleans, LA, USA: IEEE, 2022, pp. 16000-16009.
He, K., et al., "Deep Residual Learning for Image Recognition," 2016 IEEE Conference on Computer Vision and Pattern Recognition (CVPR), Las Vegas, NV, USA: IEEE, 2016, pp. 770-778.
Henriques, J., et al., "MapNet: An Allocentric Spatial Memory for Mapping Environments," 2018 IEEE/CVF Conference on Computer Vision and Pattern Recognition, Salt Lake City, UT: IEEE, 2018, pp. 8476-8484.
Humenberger, M., et al."Investigating the Role of Image Retrieval for Visual Localization—An Exhaustive Benchmark," published on arXiv:2205.15761v1, May 31, 2022, 34 pages.
Jaderberg, M., et al., "Reinforcement Learning With Unsupervised Auxiliary Tasks," ICLR 2017, 17 pages.
Jin, Y., et al., "Image Matching across Wide Baselines: From Paper to Practice," published on arXiv:2003.01587v5, Feb. 11, 2021, 27 pages.
Kendall, A., et al., "PoseNet: A Convolutional Network for Real-Time 6-DOF Camera Relocalization," 2015 IEEE International Conference on Computer Vision (ICCV), Santiago, Chile: IEEE, 2015, pp. 2938-2946.
Kim, D., et al., "Camera Localization with Siamese Neural Networks Using Iterative Relative Pose Estimation," Journal of Computational Design and Engineering 9, No. 4, Aug. 2022, pp. 1482-1497.
Konolige, K. "A Gradient Method for Realtime Robot Control," Proceedings 2000 IEEE/RSJ International Conference on Intelligent Robots and Systems (IROS 2000) (Cat. No.00CH37113), Takamatsu, Japan: IEEE, 2000, pp. 639-646.
Krantz, J., et al., "Navigating to Objects Specified by Images," published on arXiv:2304.01192v1, Apr. 3, 2023, 12 pages.
Krantz, J., et al., "Instance-Specific Image Goal Navigation: Training Embodied Agents to Find Object Instances," published on arXiv:2211.15876v1, Nov. 29, 2022, 7 pages.
Labbe, M., et al., "RTAB-Map as an Open-Source Lidar and Visual SLAM Library for Large-Scale and Long-Term Online Operation," Journal of Field Robotics 36, No. 2 (Mar. 2019): 416-446, published on arXiv:2403.06341v1, Mar. 10, 2024, 40 pages.
Li, B., et al., "Relative Pose Estimation of Calibrated Cameras with Known SE(3) Invariants," ECCV, vol. 12354, 2020, 17 pages.
Li, K., et al., "Pose Recognition with Cascade Transformers," 2021 IEEE/CVF Conference on Computer Vision and Pattern Recognition (CVPR), Nashville, TN, USA: IEEE, 2021, pp. 1944-1953.
Lluvia, I., et al., "Active Mapping and Robot Exploration: A Survey," Sensors 21, No. 7, 2445, Apr. 2, 2021, 26 pages.
Macenski, S., et al., "The Marathon 2: A Navigation System," 2020 IEEE/RSJ International Conference on Intelligent Robots and Systems (IROS), Las Vegas, NV, USA: IEEE, Oct. 2020, pp. 2718-2725.
Majumdar, A., et al., "ZSON: Zero-Shot Object-Goal Navigation Using Multimodal Goal Embeddings," 36th Conference on Neural Information Processing Systems, NeurIPS, 2022, 13 pages.
Majumdar, A., et al., "SSL Enables Learning from Sparse Rewards in Image-Goal Navigation," Proceedings of the 39th International Conference on Machine Learning, Baltimore, Maryland, USA, PMLR 16, 2022, pp. 14774-14785.
Majumdar, A., et al., "Where Are We in the Search for an Artificial Visual Cortex for Embodied Intelligence?," published on arXiv:2303.18240v1, Mar. 31, 2023, 19 pages.
Maksymets, O., et al., "THDA: Treasure Hunt Data Augmentation for Semantic Navigation," 2021 IEEE/CVF International Conference on Computer Vision (ICCV), Montreal, QC, Canada: IEEE, 2021, pp. 15354-15363.
Marder-Eppstein, E., et al., "The Office Marathon: Robust Navigation in an Indoor Office Environment," 2010 IEEE International Conference on Robotics and Automation, Anchorage, AK: IEEE, 2010, pp. 300-307.
Marza, P., et al., "Multi-Object Navigation with Dynamically Learned Neural Implicit Representations,"arXiv:2210.05129v1, Oct. 11, 2022, 20 pages.

* cited by examiner

METHOD OF TRAINING A MODEL FOR A GOAL-ORIENTED VISUAL NAVIGATION TASK

REFERENCE TO RELATED APPLICATIONS

This application claims priority to and the benefit of U.S. Provisional Patent Application Ser. No. 63/586,004, filed Sep. 28, 2023, which application is incorporated in its entirety by reference herein.

FIELD

The present disclosure relates generally to machine learning, and more particularly to methods and systems for navigation of autonomous devices, such as terrestrial robots.

BACKGROUND

Recent work in goal oriented visual navigation, or navigating to a goal by processing acquired images, relies on large-scale machine learning in simulated environments. However, it is difficult to learn, for instance, compact map-like representations that are generalizable to unseen environments. Further, it is challenging to learn high-capacity perception modules that are capable of reasoning on high-dimensional input.

High-capacity perception modules are particularly difficult to learn, for instance, when the goal is not provided as a location (coordinates), as in so-called Point-Nav tasks, or as a category, such as in so-called Object-Nav tasks, but instead is provided as an exemplar or goal image, such as in so-called ImageGoal tasks.

SUMMARY

Provided herein, among other things, are methods and systems for training a model for a goal-oriented visual navigation task, using one or more processors. A binocular encoder may be pretrained on a first pretext task comprising a masked patch reconstruction task between first images and second images, the first images being masked. The binocular encoder includes first and second twin encoders and a binocular decoder that is connected to the first and second twin encoders, wherein the first twin encoder encodes the first image, the second twin encoder encodes the second image, and the binocular encoder provides an output based on the encoded first and second images. The binocular encoder may be in addition or alternatively finetuned on a second pretext task comprising a relative pose estimation and a visibility prediction, wherein the first twin encoder encodes an observation image as the first image and the second twin encoder encodes a goal image as the second image. The trained binocular encoder may be combined with an additional monocular visual encoder and with a navigation policy module in the navigation model, wherein the navigation policy module receives the output from the binocular encoder and a representation from the additional monocular encoder. The navigation model is end-to-end trained on a downstream visual navigation task to train at least the navigation policy module and optionally the additional monocular encoder and optionally also the binocular encoder, wherein the first twin encoder encodes the observation image as the first image and the second twin encoder encodes the goal image as the second image. One or more adaptors may be combined with the trained binocular encoder during the end-to-end training.

According to another embodiment, a navigation architecture for a goal-oriented visual navigation task is provided, e.g., implemented by one or more processors, that outputs an action for navigating an agent that receives an observation image to a location in a three-dimensional environment indicated by a goal image. The architecture comprises a binocular encoder including first and second twin encoders and a binocular decoder that is connected to the first and second twin encoders. The first twin encoder encodes a first image, the second twin encoder encodes a second image, and the binocular encoder provides an output based on the encoded first and second images. A navigation policy module connected to the binocular encoder receives the output from the binocular encoder and optionally further receives an output from an additional monocular encoder taking only the observed image, and the navigation policy module outputs an action. The binocular encoder may be pretrained on a first pretext task comprising a masked patch reconstruction task between image pairs of first images and second images, and in addition or alternatively may be finetuned on a second pretext task comprising a relative pose estimation between the first and second images and a visibility prediction, wherein the first twin encoder encodes the observation image as the first image and the second twin encoder encodes the goal image as the second image. The navigation policy module with the connected binocular encoder is trained end-to-end on a downstream visual navigation task, in which the first twin encoder encodes the observation image as the first image, the second twin encoder encodes the goal image as the second image, and the additional monocular encoder taking only the observed image. One or more adaptors may be combined with the trained binocular encoder during the end-to-end training.

The navigation architecture may provide an agent for determining an action, and may be incorporated into an autonomous device, such as a robot, along with an image capturing device such as a camera, a control module (e.g., controller) for receiving an action output from the agent based on an observation image obtained from the image capturing device and a goal image obtained from the image capturing device, another image capturing device, and/or an image database, and an actuator (e.g., propulsion device) that receives control commands from the control module in response to the received action.

According to a complementary aspect, the present disclosure provides a computer program product, comprising code instructions to execute a method according to the previously described aspects; and a computer-readable medium, on which is stored a computer program product comprising code instructions for executing a method according to the previously described embodiments and aspects. The present disclosure further provides a processor configured using code instructions for executing a method according to the previously described embodiments and aspects.

Other features and advantages of the invention will be apparent from the following specification taken in conjunction with the following drawings.

DESCRIPTION OF THE DRAWINGS

The accompanying drawings are incorporated into the specification for the purpose of explaining the principles of the embodiments. The drawings are not to be construed as limiting the invention to only the illustrated and described embodiments or to how they can be made and used. Further features and advantages will become apparent from the following and, more particularly, from the description of the embodiments as illustrated in the accompanying drawings, wherein:

FIG. 6 shows different scenes and poses, and FIG. 7 shows image pairs taken from a single trajectory, varying distance to the goal.

In the drawings, reference numbers may be reused to identify similar and/or identical elements.

DETAILED DESCRIPTION

Figure 1:
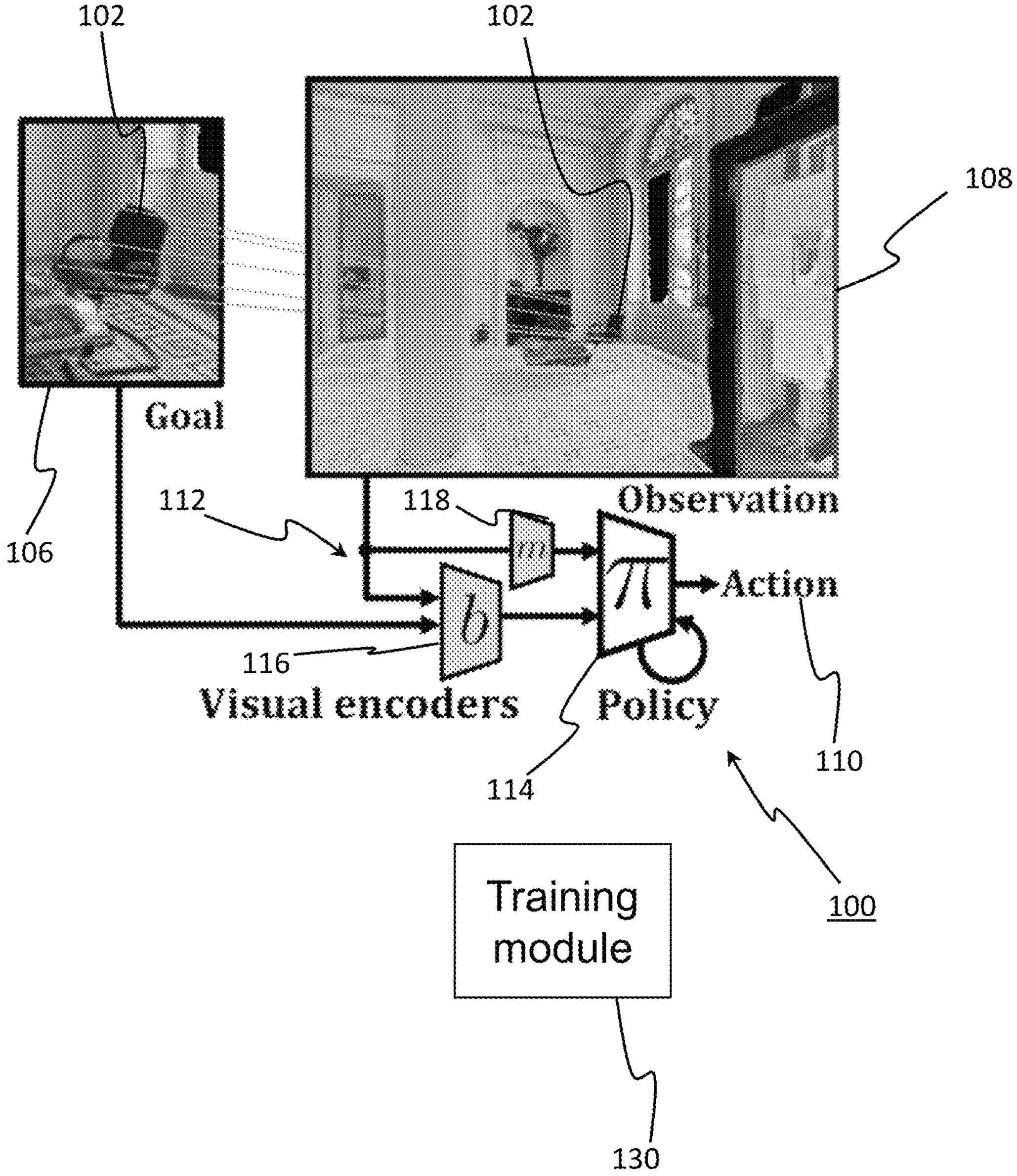
FIG. 1 shows an example navigation architecture for a goal-oriented visual navigation task.

Visual navigation has conventionally been solved in robotics using mapping and planning, which involves solutions for mapping and localization, for planning, and for low-level-control. Such methods depend on accurate sensor models, filtering, dynamical models, and optimization.

End-to-end trained models directly map input to actions and are typically trained with reinforcement learning (RL) or imitation learning. These models learn representations, such as flat recurrent states, occupancy maps, semantic maps, latent metric maps, topological maps, self-attention, or implicit representations.

In the ObjectNav setting, the goal is provided as a category. A detector can decode object shapes in model parameters, and thus can be trained explicitly for detection, such as with semantic maps, map-less object detectors or image segmenters, or end-to-end through a navigation loss.

ImageGoal, on the other hand, provides the goal as an exemplar image (goal image), and is a significantly more difficult task, as it requires a perception module to learn a matching strategy itself. To-date, some ImageGoal models have been based on end-to-end training, in some instances supported through frame-by-frame self-supervised losses. Other models use local feature matching and conventional methods for local navigation like map+baselines, for instance, or frontier-based navigation.

Goal oriented visual navigation conventionally has been addressed through large-scale training in simulation followed by a transfer to real-world environments (which may be referred to as sim2real). However, perception has been a significant problem, with challenges such as learning actionable representations required for planning, extracting three-dimensional (3D) information, which is difficult when depth is not available or not reliable, and generalizing to unseen environments, which is difficult given the limited number of available training environments.

For performing ImageGoal tasks, a perception module may be required to learn a comparison strategy, which in turn requires learning an underlying visual correspondence problem. The present inventors have recognized that such learning is difficult from reward alone or by using conventional auxiliary tasks.

According to example embodiments, a navigation architecture for a goal-oriented visual navigation task is provided. Performing the goal-oriented visual navigation task outputs an action for navigating an agent that receives an observation image to a location in a three-dimensional environment indicated by a goal image.

Example navigation architectures can be embodied in or use end-to-end models that are augmented with perception modules pretrained using pretext tasks. The present inventors have recognized that while the detection of free navigable space, obstacles, and exits can involve making decisions based on appearance cues, detection of visual goals provided by exemplar images (goal images) involves solving a partial matching task, which in essence is a multi-view visual correspondence problem. This correspondence problem may be addressed by binocular (dual visual) encoders in perception modules that are pretrained as provided herein.

The navigation architecture includes a binocular encoder including first and second twin encoders and a binocular decoder that is connected to the first and second twin encoders. The first twin encoder encodes a first image, the second twin encoder encodes a second image, and the binocular encoder provides an output such as but not limited to a latent visual representation based on the encoded first and second images. The first and second twin encoders, for instance, may be a common encoder that independently encodes each of the first and second images, respectively, or may be separate encoders having the same configuration and encoder parameters that independent encode each of the first and second images, respectively. Examples of twin encoders are provided herein. The first and second images may each be mono-view (2D) images, as opposed to panoramic images as used in some prior methods.

The navigation architecture may be modular. For example, the binocular encoder may provide or be incorporated in a perception module. Some example perception modules include a binocular encoder and a monocular encoder. An example binocular encoder is embodied in a dual visual-encoder architecture based on vision transformers (ViTs) with cross-attention. The ViT may be high-capacity, e.g., capable of processing large dimensions. In some example architectures, adaptors may also be provided for adapting the binocular encoder.

The binocular encoder includes twin encoders for independently encoding a received current observation image (an example first image) and a previously received (e.g., received and stored in memory) goal image (an example second image), and a decoder in which a comparison between the observation image and the goal image is performed. The decoder may incorporate cross-attention between the observation image and the goal image. Such methods and systems need not rely on explicit feature matching to address the correspondence problem. However, correspondence solutions still emerge from pretraining the binocular encoder through cross-attention behavior.

The binocular encoder may be pretrained on a first pretext task comprising a cross-view completion task (leading to visual correspondence calculations) between image pairs of first images and second images, e.g., a masked patch reconstruction task between first images and second images, where one of the images is masked (e.g., the first image, or the second image) and in addition or alternatively finetuned on a second pretext task comprising a relative pose estimation between the first and second images and a visibility prediction.

Training the binocular encoder may be conducted, for instance, using large-scale learning in simulated three-dimensional (3D) environments. In an example first pretext training method, the first twin encoder encodes the first image (which may be masked, e.g., at least partially), the second twin encoder encodes the second image, and the binocular encoder outputs a latent visual representation based on the encoded first and second images. An example first pretext method is provided by a cross-completion (CroCo) method, which provides a proxy for an underlying visual correspondence problem, and which includes reconstructing the masked information in the first image.

An example second pretraining procedure for the binocular encoder may fine-tune the binocular encoder on relative pose estimation (estimating the relative displacement, e.g., rotation and translation, between first and second images) plus visibility estimation (detecting whether the goal represented by the goal image is visible given the observation image), collectively referred to herein as RPEV, which more directly addresses goal detection and finding. The first twin encoder encodes the observation image as the first image and the second twin encoder encodes the goal image as the second image. Visual correspondence solutions can naturally emerge from training signals when training such a model on the pretext tasks.

The trained (e.g. pretrained, finetuned, etc.) dual encoder or perception module can be integrated into various goal-oriented navigation tasks. One example navigation task is an end-to-end agent embodied in a neural policy with recurrent memory, trained with reinforcement learning or imitation learning. Another example navigation task is a modular navigation method using a high-level planner, a low-level planner, and a simultaneous localization and mapping (SLAM) module.

For example, the perception module may be combined with a task module in the navigation architecture. Particularly, a navigation policy module connected to the binocular encoder may receive the output (e.g., latent visual representation, or direct information, such as predicted pose/goal direction and visibility) from the binocular encoder and output an action. The perception module may further include a monocular encoder (e.g., a classical monocular encoder), which receives and encodes the observation image without also encoding the goal image (e.g., it encodes only the observation image), and the navigation policy module may output an action based on the received output from the binocular encoder and an embedded observation image from the monocular encoder, as well as from other factors such as a previous state.

The navigation policy module with the connected binocular encoder (and optionally the monocular encoder) may be trained end-to-end on a downstream visual navigation task, in which the first twin encoder encodes the observation image as the first image and the second twin encoder encodes the goal image as the second image. During the end-to-end training, the binocular encoder may be frozen or have one or more layers finetuned. One or more adaptors may be combined with the binocular encoder during this end-to-end training.

The navigation architecture may provide an agent for determining an action, and may be incorporated into an autonomous device, such as a robot, along with an image capturing device such as a camera, a control module (e.g., controller) for receiving an action output from the agent based on an observation image obtained from the image capturing device and a goal image obtained from the image capturing device, another image capturing device, and/or an image database, and an actuator (e.g., propulsion device) that receives control commands from the control module in response to the received action.

Example applications include, but are not limited to, goal-oriented visual navigation tasks, in which the autonomous device (e.g., a robot) is given a goal having a location and the goal being represented by the goal image and is tasked to navigate to the location indicated by the goal image. During the navigation task, the robot receives a visual first-person input including an observation image (e.g., an RGB image or other image, which may be provided via one or more image capturing devices) at each of a series of time steps.

Conventional goal-oriented visual navigation tasks have been addressed previously through end-to-end training. However, this has resulted in very low performance in so-called mono-view settings, in which the goal and the observation each are a single image. Example methods and systems herein allow the use of deep learning approaches for such a task and setting. Example training methods incorporating pretraining allow perception modules to learn a comparison strategy efficiently, which previously has been difficult or even impossible from training on navigation alone.

In contrast to other methods that require detection of local features and adding a resulting goal compass direction to a modular map-based learned method, example methods and systems herein need not rely on explicit feature matching. Further, in contrast to methods that require sufficient overlap between images, example methods and systems can operate with image pairs that have only very small overlap (referred to herein as "wide-baseline", or even no overlap (referred to herein as "extremely wide baseline"), in which case the goal is considered not visible. Accounting for instances where a goal is not yet visual is crucial in a typical navigation setting and can be addressed using example visibility prediction pretraining methods.

Example applications include service and field robotics, and such applications can address the robot navigation problem of navigating to a goal whose coordinates are not known, but for which a visual description in the form of an image exemplar or goal image is available. More complex navigation tasks, e.g., beyond the delivery of items to specific coordinates, can be made possible. Settings for performing example navigation tasks are not limited to a fixed list of goal categories, but instead can be extended to finding any object or goal given an available goal image.

Experimental results demonstrate significant improvements on goal-oriented visual navigation tasks (e.g., ImageGoal tasks), including for the tasks of mono-view (non-panoramic) observations and goals. Learning such tasks has conventionally been more difficult.

Turning now to the drawings, FIG. 1 shows an example navigation architecture 100 for a goal-oriented visual navigation task, nonlimiting examples including so-called classical ImageNav, so-called Instance ImageNav, and others. The navigation architecture 100 provides an agent (e.g., for an autonomous apparatus or device), which is asked to navigate from a starting location to a goal location 102 in a three-dimensional environment, the goal being indicated by an exemplar or goal image 106 that is communicated to the agent.

The agent receives an observation image 108 and outputs an action 110 for navigation. In an example navigation, the agent selects one action from an action set having predetermined movement parameters, which may include, for instance, moving (e.g., forward) a predetermined distance, rotating a predetermined amount and direction (e.g., turning left a predetermined number of degrees, or turning right a predetermined number of degrees), and stopping. Actions additionally or alternatively may be continuous values for linear and angular velocities, for instance. An example action set for an action $\mathcal{A}$ can be represented as $\mathcal{A}$={MOVEFORWARD 0.25 m, TURNLEFT10°, TURNRIGHT10°, STOP}, though it will be appreciated that other movement directions are possible and movement parameters may vary. In the example action set, navigation is considered successful if the STOP action is selected when the agent is within a predetermined distance (e.g., 1 m) of a goal position in terms of geodesic distance.

In example embodiments, goal images 106 and observation images 108 can be represented via single images (mono-view) through a real or simulated red-green-blue (RGB) sensor. For instance, the agent (e.g., the navigation architecture 100) may receive at each timestep t a single image observation $x_t \in R^{3\times H\times W}$ and a goal image $x^* \in R^{3\times H\times W}$. In a nonlimiting example both H×W have a size 112×112, but the observation or goal image may be larger or smaller in other embodiments. The mono-view approach allows for more practical sensor configurations. The goal images 106 and the observation images 108 may be provided from the same or different image sources. For example, for tasks such as so-called classical ImageNav, both the goal and observation images may be provided from the same image source (e.g., image capturing device), whereas for tasks such as so-called Instance ImageNav, the goal and observation images may be provided from different sources (e.g., different or differently-configured image capturing devices). It is also contemplated that for the same task, some instances or time steps may use the same source for the goal and observation images, while other instances or time steps may use different sources for the goal and observation images. Different image sources may be embodied in the same device or in different devices, and the image sources may differ in any manner, nonlimiting examples including hardware or software configuration (e.g., camera intrinsics (such as but not limited to focal length)), point-of-view, or others.

By contrast, conventional ImageNav methods have provided goal and observation images through a same (simulated) panoramic RGB sensor, where each frame included four images taken from four directions. Additional sensor data, e.g., depth cameras obtaining RGB+D images, are not required in example embodiments herein, though use of such additional sensor data is possible.

The example navigation architecture 100 generally includes a perception module 112 and a policy module 114. The example perception module 112 includes a binocular or dual visual encoder 116 that receives the goal image 106 and the observation image 108, and in the example navigation architecture 100 further includes a monocular encoder 118 that receives the observation image 108.

Figure 2:
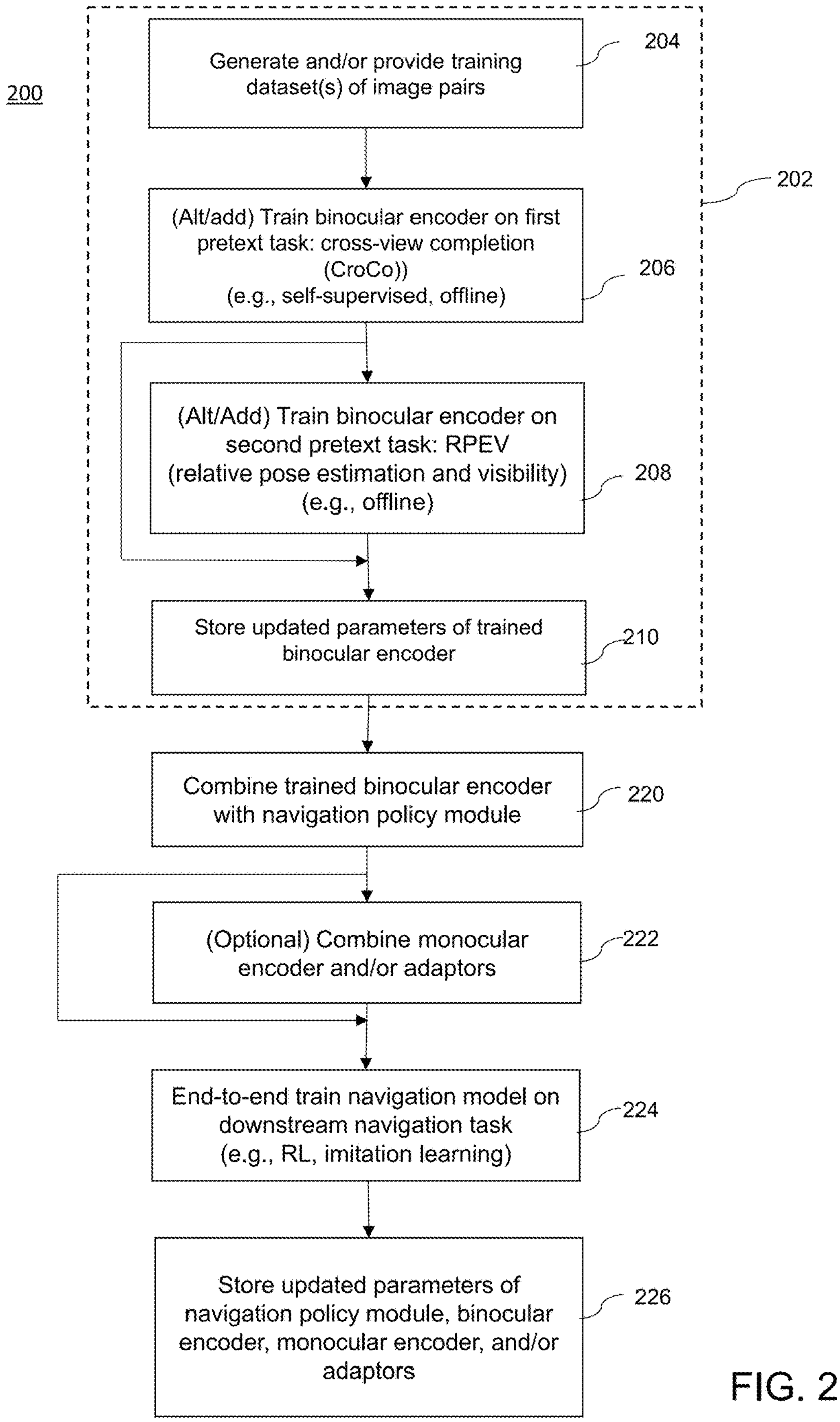
FIG. 2 shows an example training method for a goal-oriented visual navigation architecture.

FIG. 2 shows an example training method 200 for a goal-oriented visual navigation architecture, such as navigation architecture 100 including perception module 112. This goal-oriented visual navigation architecture 100 can be trained using the training method 200 for the task of image-goal navigation (ImageNav), where an agent (e.g., an autonomous device, such as a robot) is asked to navigate from a starting location to a goal that is communicated as an image, e.g., goal image 106 as shown in FIG. 1. Training may be conducted, for example, using a training module 130 connected to the navigation architecture 100.

Figure 3:
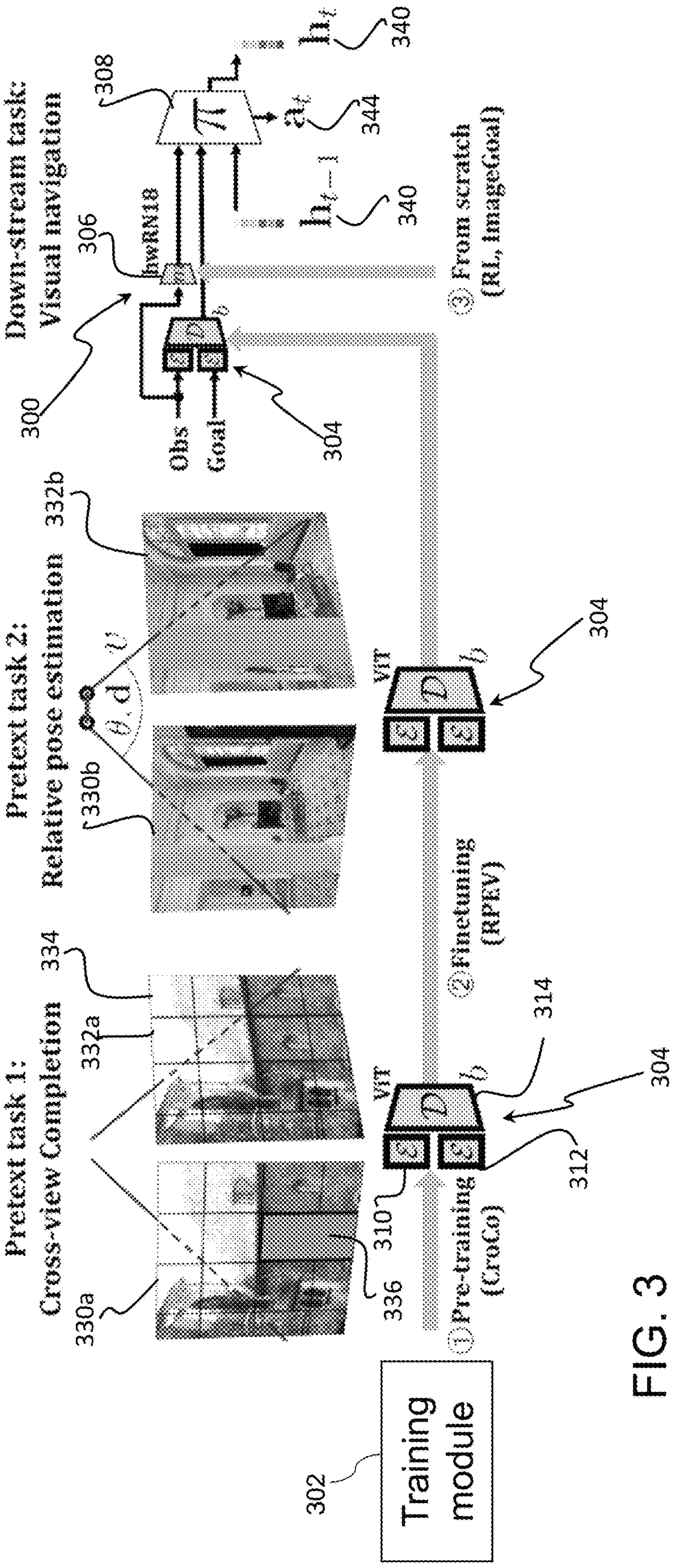
FIG. 3 shows an example navigation architecture trained using the training method in FIG. 2.

FIG. 3 shows an example navigation architecture 300 trained by a training module 302 using the training method 200 in FIG. 2. The example navigation architecture 300 (generally corresponding to navigational architecture 100) includes a binocular encoder 304 (generally corresponding to binocular encoder 112), a monocular encoder 306 (generally corresponding to monocular encoder 118), and a navigation policy module 308 (generally corresponding to navigation policy module 114). The binocular encoder 304 may be connected to the navigation policy module 308, for instance, via one or more fully connected (FC) layers (not shown in FIG. 3).

In an example embodiment, the binocular encoder b 304 may be embodied in a Vision Transformer (ViT) (V), such as disclosed in Dosovitskiy et al., an image is worth 16×16 words: Transformers for image recognition at scale. In ICLR, 2021. The binocular encoder 304 includes first and second 310, 312 twin encoders and a binocular decoder 314. The first twin encoder 310 encodes a first image, e.g., an observation image, and the second twin encoder 312 encodes a second image, e.g., a goal image. A twin or Siamese encoder generally is an encoder that is applied to the first and second images individually. The twin encoder 310, 312 may be embodied in a single encoder that separately encodes the first and second images, or in a pair of encoders having different configurations, e.g., different neural network parameters, that encode the first and second images individually. The twin encoders 310, 312 may include self-attention layers for their respective image. The binocular decoder combines both encoder outputs from the twin encoders 310, 312, and includes cross-attention layers.

The example training method 200 generally includes end-to-end training for the navigation architecture 300, enhanced via pretraining of the binocular encoder 304 on first, and in addition or alternatively second, pretext tasks. The present inventors have discovered that a main obstacle in goal-oriented visual navigation is perception, and more particularly solving visual correspondence problems. This perception task can be addressed through providing pretext tasks including visual correspondence and directional learning, and then using them as navigational insights. Example pretext tasks can include an unsupervised model pretraining for low-level scene understanding.

A perception module for a goal-oriented navigation architecture may address several subtasks. These include, for example, detecting navigable space and obstacles, detecting exits necessary for long horizon planning and detecting goals, and estimating the agent's relative pose with respect to the goal.

Some conventional perception methods in goal oriented visual navigation use techniques such as scene reconstruction, e.g., SLAM, as disclosed in Chaplot et al., Learning to explore using active neural slam. In ICLR, 2020; Lluvia et al., Active Mapping and Robot Exploration: A Survey, Sensors, 21(7):2445, 2021; and Thrun et al., Probabilistic robotics, vol. 1. MIT Press Cambridge, 2005. However, such techniques do not address goal detection, which must be outsourced to an external component.

Other conventional perception methods put the entire burden of perception on a visual encoder that is trained end-to-end from objectives such as reinforcement learning or imitation learning. However, these methods, when trained on tasks such as ImageGoal tasks, attempt to solve the goal detection problem implicitly without direct supervision through weak learning signals. This typically requires the use of more complex sensors for ImageGoal tasks compared to those used for tasks where the goal is specified through its category (e.g., ObjectNav). For example, many of the current state-of-the-art methods for ImageGoal tasks require the use of panoramic images consisting of four observed images taken at angles of ninety degrees. While this more complex input facilitates learning an underlying pose estimation task from weak learning signals, it places significant constraints for robotic applications.

Pretext tasks in general aim at learning representations followed by fine-tuning for particular tasks. In navigation or robotics, pretext tasks typically take form of auxiliary tasks such as in depth perception, contrastive self-supervised learning (SSL), or privileged information from a simulator such as object categories, goal directions, or visual correspondence in visuomotor policy. In navigation, a memory buffer can be maintained as the robot navigates.

In the example training method 200, the binocular encoder 304 is trained on one or more pretext tasks at 202. For training the binocular encoder 202, a dataset of image pairs may be provided and/or generated at 204, where each image pair includes a first image, e.g., images 330*a*, 330*b* and a second image, e.g., images 332*a*, 332*b*. The first and/or second images 330, 332 may be obtained via one or more image-capturing devices (e.g., cameras), providing as simulated or modified images, or a combination. Example image pair datasets and methods for simulating images are provided in more detail herein.

The binocular encoder 116 may be trained, e.g., pretrained, at 206 on a first multi-view pretext task for visual correspondence between the images 330*a*, 332*a*. This pretraining 206 can be self-supervised, and may be performed online or offline (or a combination). An example first pretext task for the pretraining 206 is a masked patch reconstruction task between first images and second images. An example masked patch reconstruction task is cross-view completion (CroCo), which is a three-dimensional variant of masked image modeling (MIM). Such a multi-view pretext task solves an underlying correspondence problem that is particularly relevant to an ImageGoal task.

Cross-view completion (CroCo) pretraining addresses visual correspondence by reconstructing a masked image from a reference image taken from a different viewpoint. Example cross-view completion (CroCo) methods are disclosed in Weinzaepfel et al., CroCo: Self-Supervised Pretraining for 3D Vision Tasks by Cross-View Completion. In NeurIPS, 2022, and in U.S. patent application Ser. No. 18/230,414, filed Aug. 4, 2023, and Ser. No. 18/239,739, filed Aug. 29, 2023, all of which are incorporated in their entirety by reference herein.

In an example training method for a masked patch reconstruction task such as a CroCo training method, unsupervised pretraining is performed for a machine learning model including an encoder having a set of encoder parameters and a decoder having a set of decoder parameters. Parameters may be initialized, e.g., to a same initial value, randomly, based on earlier training, based on prior knowledge, or in other ways as will be appreciated by those of ordinary skill in the art.

A pair of unannotated images may be obtained (e.g., at step 204) including a first image (shown after an example patching and masking) 330*a* and a second image 332*a* (shown after patching), where the first and second images may depict a same scene and be taken under different conditions or from different viewpoints. The first and second images 330*a* and 332*a* may use the dataset obtained in step 204, nonlimiting examples of which are disclosed in Weinzaepfel et al. and in U.S. patent application Ser. Nos. 18/230,414 and 18/239,739, and as provided in more detail herein.

The example first 330*a* and second images 332*a* in the dataset obtained at 204 can be mono-view (two-dimensional) images as shown. In a mono-view setting, there is one observation and one goal view, compared to, say, a conventional multi-view setting such as a panoramic setting (four observation views, four goal views). Example methods and systems herein can address goal oriented task navigation problems such as but not limited to the ImageGoal problem with end-to-end methods, even in a mono-view setting, by pretraining a dual visual encoder to solve tasks that require matching and correspondence capabilities.

The first image 330*a* may be split into a first set of (e.g., non-overlapping) patches and the second image may be split into a second set of (e.g., non-overlapping) patches, e.g., patch 334. A plurality of patches of the first set of patches may be masked, as shown by mask 336 in first image 330*a* encompassing two patches. During the pretraining 206, a final fully connected (FC) layer may be replaced by a patch-wise reconstruction layer for reconstruction of masked content from visible content in the second image.

The first twin encoder 310 may encode the first image into a representation of the first image 330*a* and the second twin encoder 312 (which may be the same encoder as the first twin encoder 310 or a differently configured encoder) may encode the second image 332*a* into a representation of the second image. The representation of the first image 330*a* may be transformed into a transformed representation using a cross-view completion block or other representation space block, examples of which are described in Weinzaepfel et al. The binocular decoder 314 can naturally represent the correspondence problems between image patches through attention distribution. The binocular encoder 304 reconstructs the transformed representation into a reconstructed image. The transforming of the representation of the first image 330*a* and/or the reconstructing of the transformed representation may be based on the representation of the first image and the representation of the second image 332*a*. The encoder providing the twin encoders 310, 312 and the binocular decoder 314 may be adjusted by adjusting the sets of encoder and decoder parameters to minimize a loss function.

In some example masked patch reconstruction methods, the encoder, e.g., first twin encoder 310, may encode an image, e.g., the first image 330*a*, by encoding each remaining unmasked patch of the first set of patches into a corresponding representation of the respective unmasked patch, thereby generating a first set of patch representations. The encoder, e.g., second twin encoder 312, may encode an image, e.g., the second image 332*a*, by encoding each patch of the second set of patches (e.g., unmasked patch 334) into a corresponding representation of the respective patch to thereby generate a second set of patch representations. Reconstructing the transformed representation of the first image 330*a* may include the binocular decoder 314 generating, for each masked patch of the first set of patches (e.g., the patches masked at 336), a predicted reconstruction for the respective masked patch based on the transformed representation and the second set of patch representations. The loss function may be based on a metric quantifying the difference between each masked patch and its respective predicted reconstruction.

In some example masked patch reconstruction methods, transforming of the representation of the first image 330*a* into the transformed representation may include, for each masked patch of the first set of patches (e.g., the patches masked at 336), padding the first set of patch representations with a respective learned representation of the masked patch. Generating the predicted reconstruction of a masked patch of the first set of patches may include the binocular decoder 314 decoding the learned representation of the masked patch into the predicted reconstruction of the masked patch. The binocular decoder 314 may receive the first and second sets of patch representations as input data and decode the learned representation of the masked patch based on the input data. The learned representations of the masked patches may be adjusted by adjusting the respective set of representation parameters to minimize the loss function.

Alternatively or in addition to the pretraining 206 for the first pretext task, the binocular encoder 304 may be trained, e.g., finetuned, at 208 for a second pretext task. The second pretext task may be highly correlated with navigation and positional cues from visual input. An example second pretext task combines relative pose estimation (RPE) with another pretext task, visibility estimation. An example pretext task combining a relative pose estimation subtask and a visibility estimation subtask trained using the finetuning 208 is referred to as an RPEV pretext task herein. Training for the second pretext task may be performed online, offline, or a combination.

Goal-oriented image navigation tasks (e.g., ImageGoal) can benefit from relative pose estimation (RPE). RPE has been used in computer vision, e.g., as disclosed in Kendall et al., PoseNet: a Convolutional Network for Real-Time 6-DOF Camera Relocalization, In ICCV, 2015, D. Kim and K. Ko, Camera localization with siamese neural networks using iterative relative pose estimation. J. Comput. Des. Eng., 9(4):1482-1497, 2022, Li et al., Relative pose estimation of calibrated cameras with known SE(3) invariants. In ECCV, volume 12354, pages 215-231, 2020, and Xu et al., A critical analysis of image-based camera pose estimation techniques. In arXiv:2201.05816, 2022.

Conventional RPE is configured for respectively small camera displacements and assumes high visual overlap between images. On the other hand, so-called wide-baseline RPE accounts for a scenario of large viewpoint changes and occlusions, which has been difficult to account for. Still other navigation configurations involve extremely wide-baseline RPE and visibility, as an agent (e.g., robot) may be in different and/or cluttered locations and therefore images may have small visual overlap or none at all.

The example second pretext training (finetuning) 208 for the binocular encoder 304 addresses wide-baseline RPE or even extremely wide-baseline RPE by augmenting goal-oriented navigation tasks (e.g., RPE) with a visibility estimation v, whose estimation can be linked to a specific capacity of an agent to decide whether to explore or exploit. This combination can be used to detect overlap or visibility.

The example second pretext task finetuning 208 processes image pairs each including a first image 330*b* and a second image 332*b*, where the first image 330*b* represents an observation image, and the second image 332*b* represents a goal image. The example first and second images 330*b*, 332*b*, including goal and observational images, can be mono-view (two-dimensional) images. A dataset of image pairs may be provided by a dataset obtained in step 204, a nonlimiting example of which includes a dataset for wide-baseline relative pose estimation, which may be extracted from a dataset such as the Gibson dataset (Xia et al., Gibson env: Real-world perception for embodied agents. In CVPR, 2018) and/or other datasets, and/or using a simulator such as but not limited to the Habitat simulator (Savva et al., Habitat: A platform for embodied ai research. In ICCV, 2019), tailored for navigation.

The first twin encoder 310 receives an image, e.g., the first (observation) image 330*b*, and generates a representation with self-attention, the second twin encoder 312 receives an image, e.g., the second (goal) image, and generates a representation with self-attention, and the binocular decoder 314 generates a decoded representation based on the encoded representations of the first and second images 330*b*, 332*b* with cross-attention. The initial parameters of the encoder providing the first and second twin encoders 310, 312 and of the binocular decoder are provided from the first pretext training step 206.

During the second pretext training (finetuning) 208 an RPEV head (not shown) may be connected to the binocular encoder to provide a relative pose estimation (RPE) output including, for example, a relative rotation θ and a relative (e.g., 3D) translation d, as well as a visibility estimation v. The RPEV head, for instance, may include three individual heads for rotation, translation, and visibility, respectively. This RPEV head can then be removed after the second pretext training. Additional example details of RPEV pretext tasks are provided herein.

The updated parameters of the binocular encoder 116, e.g., of the encoder and decoder, can be stored at 210 at completion of the binocular pretraining 202 after the pretraining step 206 and/or after the finetuning step 208. The binocular encoder 116 with stored parameters can provide a perception module for the navigation architecture 110.

Figure 11:
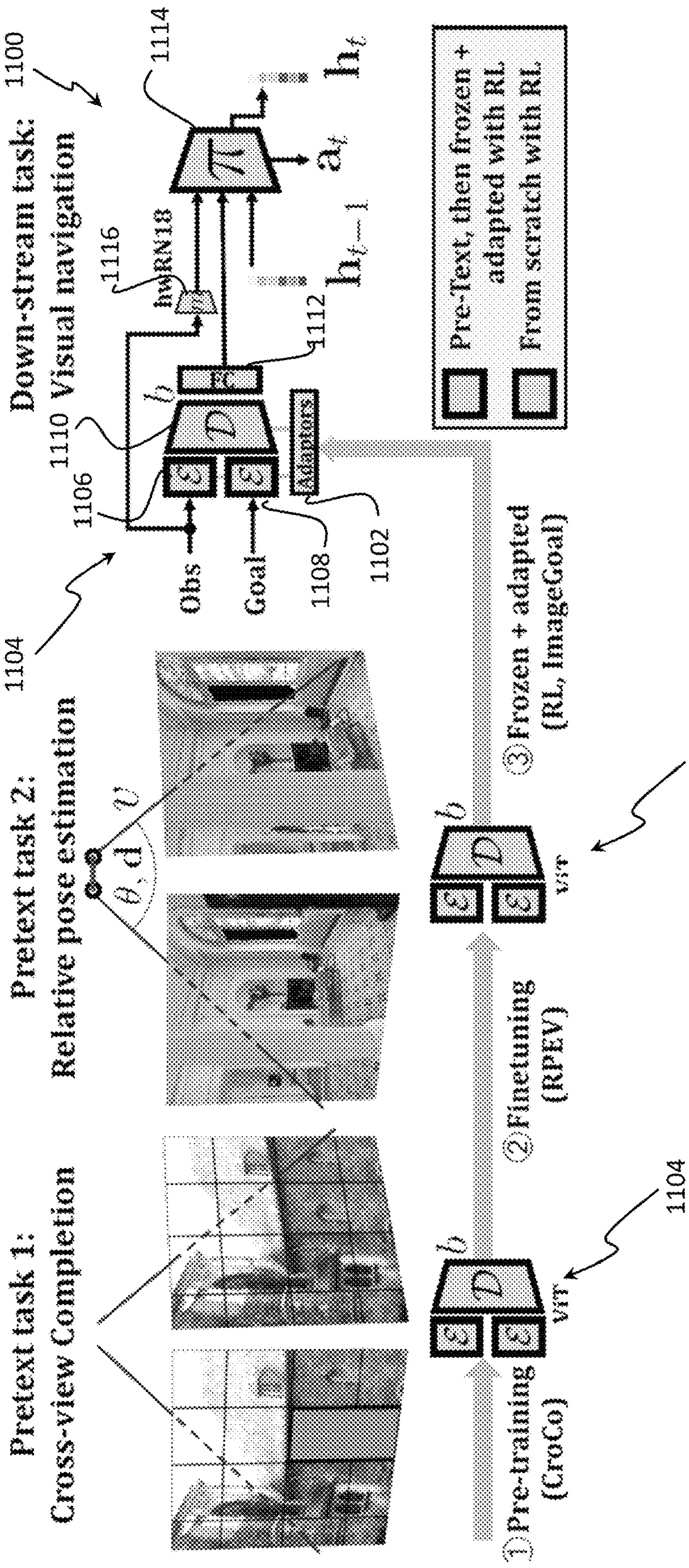
FIG. 11 shows another example navigation architecture incorporating adaptors.

After the binocular encoder pretraining 202, the trained (e.g., pretrained, finetuned) binocular encoder 304 may be combined with the navigation policy module 308 at 220, and (optionally) combined with the monocular encoder 306 at 222 to provide the navigation architecture 300. For example, the binocular encoder 304 (e.g., with the RPEV head removed) is combined with the monocular vision encoder m 306, which takes only observation images as input (that is, it does not also take the goal images as input for processing). As explained above, the finetuned binocular encoder 304 may be connected to the navigation policy module 308, for instance, via one or more fully connected (FC) layers (an FC layer is not specifically shown in FIG. 3, but is shown by example as FC layer 1112 in example architecture 1100 in FIG. 11). Additionally or alternatively, the trained (e.g., pretrained, finetuned) binocular encoder 304 may be combined at 222 with one or more adaptors, e.g., adaptors 1102 (FIG. 11). Details of example adaptors are provided herein.

The navigation policy module 308, the monocular encoder m 306 (if included) and optionally the binocular encoder 304 may be trained at 224, e.g., from scratch, by end-to-end training of the navigation architecture 300 on a visual navigation task. The example end-to-end training 224 may be performed online, offline, or a combination. The example end-to-end training 224 may use reinforcement learning (RL) methods. Other example end-to-end training methods may be used, including but not limited to those provided herein. Parameters of the monocular encoder 306 and the navigation policy module 308 may be initialized using any suitable method.

During the end-to-end training 224, the first twin encoder 310 of the binocular encoder 304 as well as the monocular encoder 306 receive an observation image (e.g., observation image 108 in FIG. 1), such as may be generated by an image-capturing device and/or simulated, e.g., at each time step t. The second twin encoder 312 of the binocular encoder 304 receives a goal image (e.g., goal image 106), which may be generated by an image-capturing device and/or simulated, and may be stored in a memory, e.g., a database.

In the navigation architecture 300 combined from steps 220, 222, the combined predictions from the binocular encoder 304 and the monocular encoder 306 (which together may be referred to as a dual encoder) are input to a policy, such as a recurrent policy or any other form of policy, including but not limited to state-less policies, provided by the navigation policy module 308, which determines states $h_t$ 340 that are maintained in a memory 342 of determined states $h_{t-1}$, and predicts actions $a_t$ 344 from the previous state (or initial state, if a state has not been determined yet) and the combined predictions.

In some example methods, during training the navigation policy module 308 and the monocular encoder 306 (e.g., end-to-end training) one or more additional layers of the binocular encoder 304 may be adapted, e.g., by additional residual multi-layer perceptrons (MLP), such as disclosed in Chen et al., AdaptFormer: Adapting Vision Transformers for Scalable Visual Recognition, NeurIPS 2022. This adapting may take place, for example, when the binocular encoder is kept frozen or partially frozen. An example architecture 1100 and training method incorporating adaptors 1102 is described hereinbelow with respect to FIG. 11.

The updated parameters of the navigation policy module 308, the monocular encoder 306, the binocular encoder 304, and/or adaptors 1102 may be stored, e.g., in memory at 226. In some example methods, the parameters of the binocular encoder 304 are frozen after the pretraining 202, e.g., after the pretraining step 206 or after the second pretext training (finetuning) step 210. In other example methods, one or more layers, e.g., N upper layers, of the binocular encoder (e.g., of the encoder providing the first and second twin encoders 310, 312, or of the decoder 314) may be finetuned during the training 224 on the navigation task, while the remaining layers are frozen. Additional updated parameters from finetuning may be stored at 226 (and may be stored at 210 for a modular binocular encoder).

For illustrating inventive features, an example training method 200, including pretraining 206, finetuning 208, and end-to-end training 224, will now be described more formally. An objective of example training methods is to learn a perception module $e_t=v(x_t, x^*)$ that predicts a useful latent visual representation $e_t$ given an observed image $x_t$ (e.g., image 108) and a goal image $x^*$ (e.g., image 106). Here, v represents the perception module, which may provide or perform a function extracting features and which may correspond to the dual encoder.

Successful goal-oriented visual navigation can involve various perception skills. For instance, low-level geometric perception of the 3D structure of the environment, which includes the detection of elements such as navigable space, obstacles, walls, and exits, is useful for successful planning. Another skill, perception of semantic categories, provides a powerful intermediate cue for other skills such as geometric perception. Detecting navigable space, for instance, is highly correlated with categories such as (Floor), (Wall), etc.

Yet another skill, specific object detection and relative pose estimation under large viewpoint changes (e.g., extremely wide baseline), is particularly useful for tasks such as ImageGoal tasks. This skill involves solving an underlying visual correspondence problem, which may be assisted by the integration of semantic cues.

Formally, the perception module may include a binocular model $b(x_t, x^*)$, such as may be provided from binocular encoder 116, 304, which targets specific object detection, goal detection, and goal pose estimation, and a monocular model, $m(x_t)$, such as may be provided from monocular encoder 118, 306, which targets low-level geometric perception and semantic category perception skill that are not related to the goal $x^*$. The two encoders produce embeddings $$e_t^b$$

and $$e_t^m$$

respectively, which are integrated into a recurrent policy (e.g., policy modules 114, 308), where:

(goal direction)

$$e_t^b = g(b(x_t, x^*))$$

(low – level geometric perception, semantic category perception)

$$e_t^m = m(x_t)$$

(recurrent state update (agent memory))

$$h_t = f\left(h_{t-1}, e_t^b, e_t^m, l(a_{t-1})\right)$$

(policy)

$$p(a_t) = \pi(h_t)$$

In the above, g is a fully connected layer, l is an embedding function, and f is the update function of a gated recurrent unit (GRU), such as disclosed in Cho et al., Learning phrase representations using RNN encoder-decoder for statistical machine translation, In Conference on Empirical Methods in Natural Language Processing, 2014. The equations of gating functions will be appreciated by an artisan and are omitted herein for clarity. The memory of the agent may also be handled by other modules like LSTM (Hochreiter, Sepp; Schmidhuber, Juergen (1996). LSTM can solve hard long time lag problems. Advances in Neural Information Processing Systems), or any other type of agent structure.

The example monocular encoder $m(x_t)$ addresses skills not related to the goal. As a result, the monocular encoder can be kept reasonably small. An example monocular encoder is embodied in a half-width ResNet architecture, such as disclosed in He et al., Deep residual learning for image recognition. In CVPR, 2016, which may be trained entirely from scratch and from reward only.

The example binocular visual encoder $b(x_t, x^*)$ can itself be decomposed into a monocular encoder $\varepsilon$ (e.g., as in ViT, disclosed in Dosovitskiy et al., 2021) that is applied to each image individually (e.g., as twin or Siamese encoders, such as twin encoders 310, 312) and a binocular decoder $\mathcal{D}$ (e.g., as in ViT with cross-attention) combining both encoder $\varepsilon$ outputs, e.g., binocular decoder 314. The binocular visual encoder may be expressed as:

$$e_t^b = b(x_t, x^*) = \mathcal{D}(\mathcal{E}(x_t), \mathcal{E}(x^*))$$

The above binocular encoder can (but not necessarily) be implemented as a ViT with self-attention layers in both the encoder $\mathcal{E}$ and the decoder $\mathcal{D}$ and with cross-attention layers in the decoder $\mathcal{D}$. The cross-attention layers can naturally represent the correspondence problems between image patches through the attention distribution. Other example features that may be incorporated in an example binocular encoder architecture are disclosed in P. Weinzaepfel et al., CroCo: Self-Supervised Pretraining for 3D Vision Tasks by Cross-View Completion. In NeurIPS, 2022, and in U.S. patent application Ser. No. 18/230,414, filed Aug. 4, 2023, and Ser. No. 18/239,739, filed Aug. 29, 2023. Additional example features of transformer layers are also provided in Vaswani et al., "Attention is all you need", NeurIPS, 2017, and in U.S. Pat. No. 10,452,978.

Example methods train perception separately through losses highly correlated to low-level geometric perception, perception of semantic categories, and specific object detection and relative pose estimation. For instance, as shown in FIG. 2, the binocular model b is trained first at step 206 with the CroCo pretext task (an example masked patch reconstruction task) requiring reasoning on low-level geometry and is then fine-tuned at step 208 on a second pretext task, RPEV, directed to navigation such as ImageGoal navigation.

First pretext training: Cross-view completion (CroCo) is a useful pretraining task that may be trained using a large amount of heterogeneous data. The CroCo task captures the ability to perceive low-level geometric cues that are highly relevant to vision downstream tasks. CroCo is an extension of masked image modeling (MIM), such as disclosed in He et al., Masked autoencoders are scalable vision learners. In CVPR, pages 15979-15988, 2022, which processes pairs of images (x, x'), which correspond to two different views of the same scene with important overlap.

The images are split into sets of non-overlapping patches $p=\{p_i\}_{i=1 \ldots N}$ and $$p' = \{p'_i\}_{i=1 \ldots N}$$

respectively. The first input image x is partially masked, e.g., as described in U.S. patent application Ser. Nos. 18/230,414 and 18/239,739 and shown by example in FIG. 3, and the set of non-masked patches is denoted $\tilde{p}$.

The CroCo pretext task requires the reconstruction (e.g., via a patch-wise reconstruction layer r) of the masked content $p\backslash\tilde{p}$ from the visible content in the second image x', $$\hat{p}=r(b(\tilde{p},p'))$$

Where $b(\tilde{p}, p')=\mathcal{D}(\mathcal{E}(\tilde{p}), \mathcal{E}(p'))$ is composed of an encoder $\mathcal{E}$ implemented as a vision transformer (ViT) with self-attention, and a decoder $\mathcal{D}$ implemented as ViT with self- and cross-attention.

Training the CroCo Model Minimizes the MSE Loss:

$$\mathcal{L}(x, x') = \frac{1}{|p\backslash\tilde{p}|}\sum_{p_i \in p\backslash\tilde{p}} \|\hat{p}_i - p_i\|^2.$$

In an example training method, model weights such as disclosed in Weinzaepfel et al., and in U.S. Pat. App. No. U.S. patent application Ser. Nos. 18/230,414 and 18/239,739 may be used, or the model may be retrained. Smaller variants of the model may be used as well. An example training dataset includes 1.8 million images pairs rendered with the Habitat simulator, following the sampling strategy set out in Weinzaepfel et al. and in U.S. patent application Ser. Nos. 18/230,414 and 18/239,739. Other example training datasets are provided herein.

Second pretext training: Once the binocular encoder b is pretrained for the first pretext task (step 206), it is finetuned on a second pretext task (step 208), namely relative pose estimation and visibility (RPEV) for navigation settings. While for navigation purposes a two-dimensional vector t may be sufficient, which 2D vector encodes the direction and distance from the agent to the goal, an example RPEV task training may train the prediction of the full classical relative pose estimation (RPE) problem, which further includes a rotation matrix R encoding the rotation of the goal towards the agent. This can add useful learning signals.

Conventionally, accurate RPE assumes that the two images (observation and target) share a sufficiently large part of the visual content, with the overlap providing cues sufficient to estimate the translation and rotation components from one image to the other. However, in navigation settings, as the agent navigates, it is initially placed far from the goal location and is required to explore the scene. In such cases, the RPE task is either undefined (e.g., in cases where the object does not exist) or it cannot be solved through geometry and correspondence, since no scene points are shared between the two images.

To address this, example training methods can add to a training dataset the underlying geometry information given by the visibility measure. This ensures feasibility of RPE and excludes image pairs with insufficient correspondence from training the translation and rotation pose components, although the pose components are still trained even for extremely low amounts of overlap and low visibility are treated as an extreme case of pose estimation (that is, an extremely wide baseline).

This also provides additional features to the agent. Visibility is a strong prior in both positive and negative cases. High visibility indicates a relative closeness of the agent's observation to the image goal, which can then choose to trust and exploit the goal direction information t provided by the same model. Low visibility, on the other hand, suggests the agent to explore the scene and rather move away from the current position.

Visibility v may be defined, for instance, as the proportion $v \in [0,1]$ of image patches $$p'_i$$

of the goal image x' which are visible in the observed image x. This definition is not symmetric, and exchanging the two images alters the visibility value. For prediction and training, some example methods use a deterministic prediction in which a binary visibility value $\bar{v}$ is calculated as $\bar{v}=1_{v>\tau}$ by thresholding visibility with a threshold $\tau=0.2$, where $1_\omega$ is the indicator function equal to 1 if condition $\omega$ is satisfied and zero otherwise. Training using a binary visibility value can use a cross-entropy loss, for example. In other example methods, visibility is output as a regressed continuous value, a stochastic prediction is made, e.g., by sampling, and a loss such as L1 loss can be used for training.

To provide the RPEV model, the two example RPE components, translation $t \in \mathbb{R}^3$ and rotation matrix $R \in \mathbb{R}^{3\times 3}$, as well as visibility $\bar{v}$, are predicted from an additional head h(•) (RPEV head) attached to the binocular encoder, taking the embedding $e^b$ as input, $$(t, R, \bar{v}) = h(e^b) = h(b(x, x^*))$$

Where x is the observed image and x* is the goal image. Head h (which may be composed, e.g., of multiple individual heads, such as three heads) is coupled to the ViT decoder $\mathcal{D}$ by flattening the embeddings of the last transformer layer and passing them through a linear layer.

To ensure that R is a valid rotation matrix, an orthogonal Procrustes orthonormalization from the Roma library (R. Bregier, Deep regression on manifolds: a 3D rotation case study. In Intern. Conf. 3D Vision (3DV), 2021) (for example) can optionally be used.

After the first (CroCo) pretraining at step 206, the RPEV model is finetuned at 208, e.g., with the following losses. Adding indices i to denote input image pairs, the RPEV loss may be defined as:

$$\mathcal{L}_{\mathcal{RPEV}} = \sum_i [\mathcal{L}_{\mathcal{CE}}(\bar{v}_i, \bar{v}_i^*) + \bar{v}_i^* \{\|t_i - t_i^*\| + \|R_i - R_i^*\|\}],$$

Where $$t_i^*, R_i^*, \overline{v_i^*}$$

denote ground truth values, and $\mathcal{L}_{\mathcal{CE}}$ is the binary cross-entropy loss for visibility (the loss can be adjusted to provide an L1 loss where the visibility is regressed). The visibility loss is evaluated for all image pairs, while the RPE loss is evaluated only for pairs with a visible goal.

An example training dataset may be collected that is tailored to perception in ImageGoal navigation by sampling random views, e.g., from scenes in the Gibson (Xia et al., 2018); MP3D (Chang et al., Matterport3d: Learning from rgb-d data in indoor environments, In Intern. Conf. on 3D Vision (3DV), 2018); and/or HM3D (Ramakrishnan et al., Habitat-matterport 3d dataset (HM3d): 1000 large-scale 3d environments for embodied AI, In Thirty-fifth Conference on Neural Information Processing Systems Datasets and Benchmarks Track, 2021) datasets. A standard train/validate scenes split may be used.

To generate images for the training dataset, two points may be sampled uniformly on the navigable area, and the pathfinder may be queried for the shortest path from one to the other. This path may be split into, for instance, five parts corresponding to increasing geodesic distance thresholds ("in reach"≤1 m, "very close"≤1.5 m, "close"≤2 m, "approaching"≤4 m, and "far">4 m), and ten (for example) intermediate positions and orientations along the path in each part are sampled, from which images are captured. The fractions of pixels in each goal image visible from any of the previously captured ones using the depth frames are computed, which are then discarded. This example process may be repeated until 100 trajectories per scene (for example) are sampled, yielding a total of near 68.8 M image pairs (for example) with position, orientation, and visibility labels. These numbers are merely examples, however, and larger or smaller amounts of image pairs may be used, such as disclosed elsewhere herein. The data may, but need not, be augmented, such as by including inversions of generated image pairs, color jittering, etc.

Example Navigation Architecture

A network having a navigation architecture 300 according to example methods and systems may be implemented in PyTorch, as a nonlimiting example, and/or using other machine learning frameworks. Example models have been trained on a heterogeneous computer cluster including A100 and V100 GPUs with different sizes of GPU memory.

In an example navigation architecture 300, a binocular encoder b 304 may have an architecture similar or identical to the encoder architecture disclosed in Weinzaepfel et al, 2022, and in U.S. patent application Ser. Nos. 18/230,414 and 18/239,739. An example "large" version of the binocular encoder, referred to below as DEBiT-L, can be equivalent to that disclosed in Weinzaepfel et al., 2022 in which the encoder ε (e.g., providing twin encoders 310, 312) is composed of L=12 self-attention blocks with H=12 heads each and an embedding dimension d=768. The example decoders $\mathcal{D}$ 314 in such a configuration is composed of L=8 cross-attention blocks with H=16 heads each and an embedding dimension d=512. Otherwise, the example binocular encoder 304 may be configured similarly to a standard (monocular) Vision Transformer (ViT).

Example cross-attention blocks in the decoder 314 may be composed, for instance, of the following layers:

- A self-attention layer, which is applied to the features corresponding to the current view (which may be already enriched by features from the goal view in previous blocks), with a pre-normalization layer (LayerNorm) and skip-connection.
- A cross-attention layer, where the resulting features are used as queries on the goal view features (used as keys and values, and may optionally also be pre-normalized) in the cross-attention layer, with skip-connection.
- A two-layer perceptron with dim d=2048 and back to d=512, which independently projects the features of each patch, with pre-normalization, GELU activation, and skip-connection.

The decoder blocks may be followed by a single patch-wise linear layer, which can also be seen as a 1×1 convolution on the features of all patches in 2D, which projects them all from dimension 512 to 64, before flattening them to a 3136-dim vector (for example input images of size 112×112 and patches of size 16×16).

Other example models are shown in Table 2, below, which can vary from the above DEBiT-L example in the number of layers (blocks), heads, and/or embedding sizes to provide variants referred to as DEBiT-B (base), DEBiT-S (small), and DEBiT-T (tiny).

An example auxiliary head h for RPEV finetuning (step 208) will now be described. Predictions of the relative camera translation t and rotation R, as well as goal visibility from current view v, may be obtained in an example by three different two-layer perceptrons, providing a translation head, a rotation head, and a goal visibility head, respectively. The perceptrons take the 3136-dim binocular embedding as input, and project it to their own 512-dim hidden vector with ReLU activation, before producing their estimation. For example, the translation head may directly output a 3D vector in the coordinate frame of the current view, and the rotation head may output a 9D vector, which can be reshaped as a 3×3 matrix, constrained to be a valid rotation matrix with a small regularization term added to the loss.

In some example embodiments, the goal visibility head solves a classification problem by outputting two logit values corresponding to low and high visibility classes (e.g., $\bar{v}<0.2$ and $\bar{v}\geq 0.2$). In other example embodiments, the goal visibility head may directly output a regression value.

An example monocular encoder m 306 may be embodied in a half-width ResNet-18, which may be similar to a standard ResNet-18, such as disclosed in Zhu et al., Gibson env: Real-world perception for embodied agents, in CVPR, 2018, but may differ in certain ways. For example, instead of using 64, 128, 256, and 512 channels in the four layers (of two basic blocks each), an example half-width ResNet-18 may use, say, 32, 64, 128, and 256 channels. All BatchNorm2D layers may be replaced by GroupNorm layers, e.g., with 16 groups each. Additionally, or alternatively, the final layer (global pooling+linear layer) may be replaced by a small "Compression" module which may include, for instance, a 3×3 convolution (with padding) reducing the number of channels from 256 to 128, followed by a LayerNorm and a ReLU activation, whose result is flattened and fed to a linear layer to produce a 512-dim flat embedding of the current (monocular) view.

An example navigation policy module (recurrent policy) (f, π) 308 may rely on a single-layer gated recurrent unit (GRU) as a recurrent state encoder. Three flat features vectors, produced by the example binocular 304, monocular 306, and previous action encoders 340, respectively, are concatenated and fed to the GRU, whose output $h_t$ may be passed to two linear heads that respectively generate a softmax distribution over the action space (Actor head) 344 and an evaluation of current state (Critic head) 340. An example agent may be structurally similar to the agent disclosed in Ramakrishnan et al., PONI: Potential Functions for ObjectGoal Navigation with Interaction-free Learning, in CVPR, 2022; and Wijmans et al., Dd-ppo: Learning near-perfect pointgoal navigators from 2.5 billion frames, in ICLR, 2019, used for the related PointGoal navigation task, but here with different input modalities (e.g., RGB+ImageGoal instead of RGB-D+PointGoal).

Navigation training: An example navigation architecture 300 may be trained on goal locations (as opposed to goal objects). The goal images, for instance, may be taken with an image-capturing device (e.g., a camera) with the same or close intrinsics, but this is not required in all embodiments.

After the first and second pretraining phases (CroCo+RPEV), the parameters of the binocular encoder b may be frozen. Then, the parameters of the recurrent policy (f, π), e.g., navigation module 308, and the monocular encoder m, e.g., monocular encoder 306, are trained jointly. In other example embodiments, the last 1 to N layers of the binocular encoder may be fine-tuned, while other layers are frozen.

An example navigation training method for end-to-end training step 224 may use proximal policy optimization (PPO), such as disclosed in Schulman et al., Proximal policy optimization algorithms. arXiv preprint, 2017, with an example reward definition $$r_t = K\cdot 1_{success} - \Delta_t^{Geo} - \lambda$$

where K=10, $$\Delta_t^{Geo}$$

is the increase in geodesic distance to the goal, and slack cost λ=0.01 encourages efficiency, similar to that disclosed in Chatopakhyay et al., Robustnav: Towards benchmarking robustness in embodied navigation. CoRR, 2106.04531, 2021, for PointGoal.

Experiments

Experiments will now be described for an example perception module referred to as a Dual Encoder Binocular Transformer (DEBiT). An example ImageGoal task in experiments is the official Habitat PointGoal task, e.g., as disclosed in Majumdar et al., SSL enables learning from sparse rewards in image-goal navigation. In ICML, volume 162, pages 14774-14785, 2022, and in Mezghani et al., Memory-augmented reinforcement learning for image-goal navigation. In IROS, 2022, where the ImageNav benchmark is generated from the standard (coordinate based) PointGoal benchmark. This is done by generating the goal image by taking an observation of at the point goal coordinates of the PointGoal task.

Example models were trained for 200M steps on an A100 GPU. A combined dataset (Gibson, Matterport 3D, and HM3D) (933 scenes) was used for RPEV finetuning and for reinforcement learning (RL) training of the policy and the monocular encoder. Visibility was determined using a continuous indicator, e.g., by omitting a threshold that may be used for a binary indicator and training using an L1 loss, instead of training using a cross-entropy loss for an example binary indicator in other example methods.

The last fully-connected layer (parameters) of the binocular encoder was finetuned during the RL training, while otherwise the binocular encoder was kept frozen during the RL training. Other example end-to-end training methods may completely freeze the binocular encoder during the RL training, as disclosed above.

An example training dataset for CroCo pretraining included 1.8 million images pairs rendered with the Habitat simulator, following the sampling strategy set out in Weinzaepfel et al. and in U.S. patent application Ser. Nos. 18/230,414 and 18/239,739. Scenes from the MP3D dataset, as disclosed in Chang et al., 2018, were also used for CroCo pretraining. Performance was considered on Gibson-val (14 scenes), and it was used as a test set, using the unseen episodes disclosed in Mezghani et al., Memory-augmented reinforcement learning for image-goal navigation. In IROS, 2022. Checkpoints were chosen from an independent hold-out set, though in other example methods the last N training checkpoints, for instance, may be taken.

Relative pose estimation (RPE) was evaluated in the percentage of correct poses for given thresholds on distance and angle, e.g., 1 meter and 10°. Visibility was evaluated by its accuracy. Navigation performance was evaluated by success rate (SR), which is the number of episodes correctly terminated (that is, within a distance of <1 m to the goal and a correctly predicted STOP action), and by SPL, which is success rate weighted by the optimality of the path, i.e., $$SPL = \frac{1}{N}\sum_{i=1}^{N} S_i\left(\frac{\ell}{\max(\ell_i, \ell_i^*)}\right),$$

where $S_i$ is a binary success indicator in episode i, $\ell_i$ is the agent path length, and $\ell_i^*$ is the ground-truth (GT) path length.

A comparison was made to the Siamese Encoder baseline, as disclosed in K. Yadav, A. Majumdar, R. Ramrakhya, N. Yokoyama, A. Baevski, Z. Kira, O. Maksymets, and D.

Batra. OVRL-V2: A simple state-of-art baseline for ImageNav and ObjectNav. In arXiv:2303.07798, 2023. In this work, observed image $x_t$ and the goal image x* are encoded separately passe embeddings to a recurrent policy trained with RL. Pre-training is done with classical Masked Auto-Encoding which considers single images only.

Additional comparisons were made to an adapted modular approach designed for explorations, Active Neural SLAM. Active Neural SLAM, disclosed in Chaplot et al., Learning to explore using active neural slam, In ICLR, 2020, is composed of a high-level policy prediction waypoints, and a low-level policy navigating to goal. This model was adapted to the ImageGoal task by adding an example binocular encoder as an additional perception module. The perception module switches between navigation towards the predicted goal with the local policy or exploration using the global+local policy, otherwise.

Figure 4:
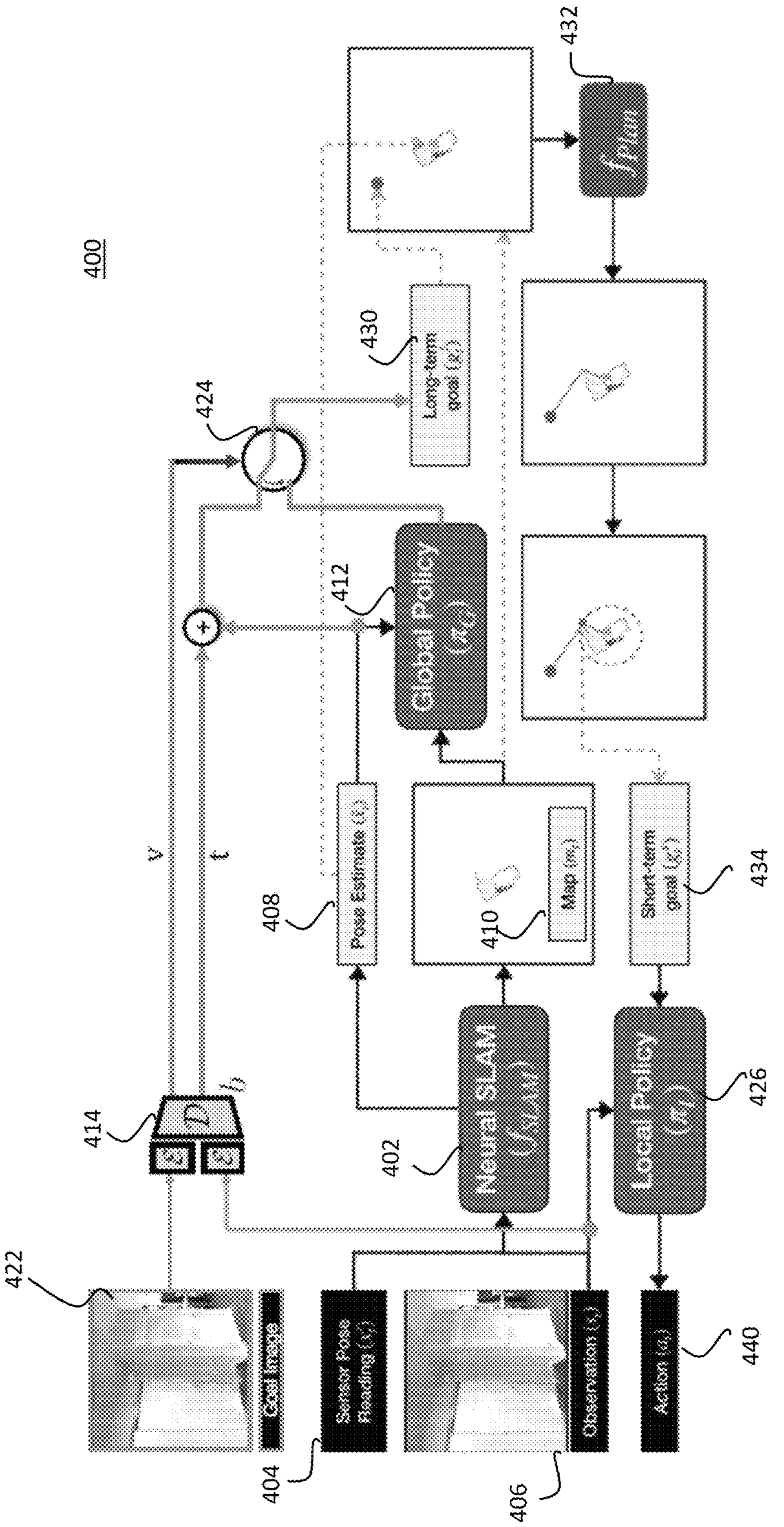
FIG. 4 shows an example adaptation of an Active Neural SLAM (ANS) architecture (network) to an ImageGoal task.

FIG. 4 shows the example adaptation of an Active Neural SLAM (ANS) architecture (network) 400 to the ImageGoal task. The ANS architecture 400 includes a Neural SLAM module ($f_{SLAM}$) 402, which receives a sensor pose reading 404 and an observation image 406. The Neural SLAM module 402 outputs a pose estimate 408 and a mapping 410, which are input to a global policy module $\pi_G$ 412. The example binocular encoder 414 is incorporated into the Active Neural SLAM architecture 400 to receive the observation image 406 as well as a goal image 422. The binocular encoder 414 outputs a visibility prediction $v_t$ to a switching module 424, and an output t which may be combined with the pose estimate 408 from the Neural SLAM module 402. An output from the global policy module 412 is also fed to the switching module 424. The switching module 424 switches between (1) navigation towards the predicted goal with a local policy 426 and (2) exploration using the global+local policy 412, 426 otherwise, by thresholding the visibility prediction $v_t$ with a threshold T, which is selectable and provides sensitivity.

The global policy module 412, when selected by the switching module 424, is output to a long-term goal module 430, and to a planning module $f_{plan}$ 432. The planning module 432 in turn is provided to a short-term goal module 434, the output of which is fed to the local policy module $\pi_L$ 426. The local policy module 426 also receives the sensor pose reading 404 and the observation image 406, and outputs an action $a_t$ 440.

Table 1, below, shows an example impact of model capacity of a binocular encoder, e.g., binocular encoder 116, 304 for an example navigation architecture such as architectures 100, 300 on both RPEV and navigation performance, where L=layers, H=heads, and d=embedding dimension. An example monocular encoder, e.g., monocular encoder 118, 306 embodied in a half-width ResNet-18 was used in each variant. All models were pretrained using CroCo and RPEV. Experiments considered variations in model capacity distributed over the encoder E and the decoder D of the binocular visual encoder b (where the monocular part m was unchanged). Four example model sizes were considered, as shown in Table 2: DEBiT-L ("Large") (corresponding to the architecture disclosed in Weinzaepfel et al.), DEBiT-B ("Base"), DEBiT-S("Small"), and DEBiT-T ("Tiny"). Performance generally improved with model capacity (though saturation may occur).

TABLE 1

| Variant | | DEBiT-L | DEBiT-B | DEBiT-S | DEBiT-T |
|---|---|---|---|---|---|
| Encoder | L | 12 | 12 | 12 | 8 |
| | H | 12 | 6 | 6 | 6 |
| | d | 768 | 384 | 384 | 384 |
| Decoder | L | 8 | 8 | 2 | 2 |
| | H | 16 | 16 | 8 | 8 |
| | d | 512 | 512 | 256 | 256 |
| #params | (binoc) | 120M | 55M | 24 M | 17 M |
| Monoc | | hwRN18 | hwRN18 | hwRN18 | hwRN18 |
| % correct | 1m&10° | 85.4 | 81.0 | 70.1 | 68.6 |
| poses | 2m&20° | 91.9 | 90.7 | 86.5 | 86.0 |
| Vis-acc | (%) | 93.7 | 93.2 | 90.9 | 90.7 |
| Nav. perf. | R (%) | 82.0 | 83.0 | 79.6 | 79.3 |
| | SPL (%) | 59.6 | 55.6 | 52.1 | 50.0 |

Table 2, below, shows an impact of pretraining strategies for the two largest example variants, DEBiT-L and DEBiT-B, where CroCo pretraining and RPEV pretraining were ablated. It was demonstrated that pretraining an example dual encoder with CroCo and then RPEV led to significant performance improvement over directly training the model from scratch on the navigation task (the reward as a learning signal was too weak), directly training on RPEV, or only pretraining using CroCo and not RPEV. Training on both pretext tasks was found to provide a significant gain and head start during training.

TABLE 2

| | | | % corr. poses | | Vis- | | |
|---|---|---|---|---|---|---|---|
| | Pre-train | | 1 m& | 2 m& | acc | Nav. perf. | |
| Variant | CroCo | RPEV | 10° | 20° | (%) | SR | SPL |
| DEBiT-L | X | X | n/a | n/a | n/a | 7.0 | 4.4 |
| DEBiT-L | ✓ | X | n/a | n/a | n/a | 60.2 | 33.1 |
| DEBiT-L | ✓ | ✓ | 85.4 | 91.9 | 93.7 | 82.0 | 59.6 |
| DEBiT-B | X | X | n/a | n/a | n/a | 6.8 | 4.0 |
| DEBiT-B | ✓ | X | n/a | n/a | n/a | 65.7 | 37.3 |
| DEBiT B | ✓ | ✓ | 81.0 | 90.7 | 93.2 | 83.0 | 55.6 |

Conventional visual encoders for end-to-end trained ImageGoal solutions are based on late fusion approaches embodied in Siamese networks, where an input observed image $x_t$ and goal image x*are encoded separately, and the respective embeddings are input to current policies. This late fusion approach allows training of the models from weak reward signals, as the individual encoders learn high-level representations that are compared later in the pipeline. However, the late fusion of observation and goal features does not ease learning geometric comparisons.

By contrast, example methods and systems can obtain image comparisons of higher quality through early fusion, in which images are compared close to input, e.g., on patch-level. Such an approach can lead to a finer visual perception, where correspondence information is encoded in the representation in a more direct way, and can provide a more useful signal to the policy (e.g., a connected policy module).

Other conventional architectures give pose and visibility estimates directly to the policy. However, this approach does not provide certain benefits of end-to-end trained models, e.g., richer latent embeddings passed from penultimate layers of a visual encoder.

Further, the mono-view setting is much more difficult than the classical panoramic setting, making known baselines non-comparable. For example, Krantz et al., Navigating to objects specified by images, in arXiv:2304.01192, 2023, and Mezghani et al., 2022, have disclosed results comparing performance of a mono-view setting (1 observation, 1 goal view) with a classical panoramic setting (4 observation views, 4 goal views), indicated by comparing Siamese baselines on the SPL metric. In spite of a significantly higher capacity, the disclosed mono-view baselines resulted in a ~16× performance drop in the mono-view setting compared to the panoramic one.

Figure 5A:
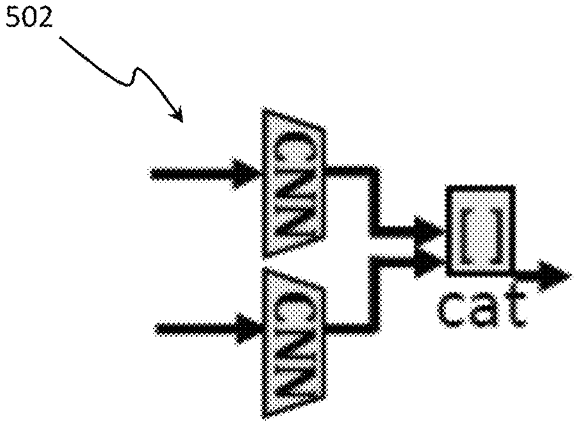
FIGS. 5A-5C show a comparison of architectures including a Siamese architecture trained from scratch on navigation reward alone (Siam. hwRN18) (FIG. 5A), a Siamese architecture with an additional monocular encoder 506 and pretrained for RPEV (Siam. hwRN18+m) (FIG. 5B), and an example embodiment architecture (DEBiT-B+m) (FIG. 5C).
Figure 5B:
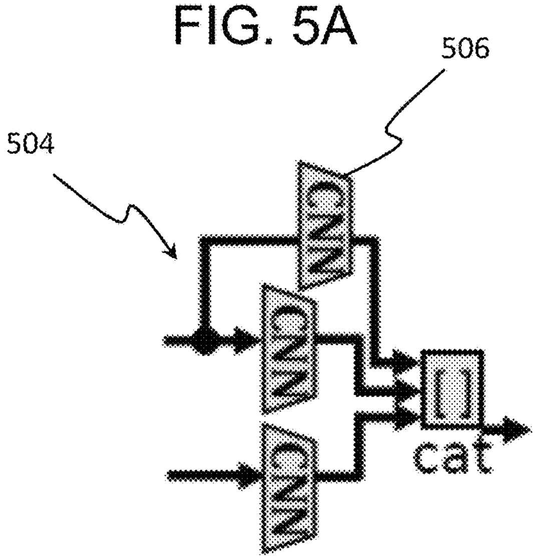
Figure 5C:
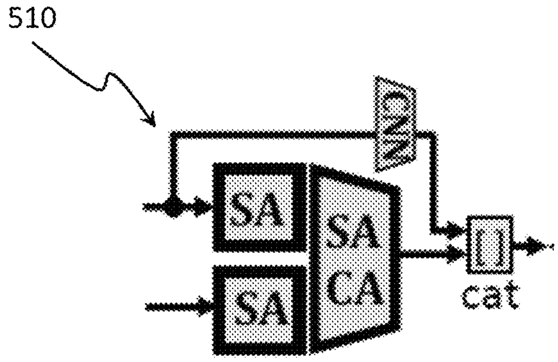

FIGS. 5A-5C show a comparison of architectures including a Siamese architecture 502 trained from scratch on navigation reward alone (Siam. hwRN18) (FIG. 5A), a Siamese architecture 504 with an additional monocular encoder 506 and pretrained for RPEV (Siam. hwRN18+m) (FIG. 5B), and an example embodiment architecture 510 (DEBiT-B+m) (FIG. 5C), which in some instances was trained from scratch on navigation reward alone, and in others was trained with self-supervised pre-training (CroCo and RPEV) and then fine-tuned on the navigation task.

Table 3, below, shows performance results for architectures 502, 504, 510. When architectures were trained from scratch on navigation reward alone, the Siamese visual encoder had better performance. However, when the example embodiment architecture 510 was trained using self-supervised pretraining and fine-tuning, it significantly outperformed all models, learning signals that enabled learning the correspondence problem solved by the encoder-decoder structure of the binocular steam. The results demonstrate that example navigation architectures trained according to example methods can outperform the Siamese baselines when pretrained with both the above first and second pretext tasks (CroCo, RPEV). The CroCo pretraining allows the correspondence on a patch level to emerge, which leads to more accurate pose estimates.

TABLE 3

| Visual encoder | Pre-train | #parms | SR | SPL |
|---|---|---|---|---|
| Siamese hwRN18* | No | 4.1M | 10.1 | 9.6 |
| Siamese hwRN18* + m | RPEV | 8.3M | 8.0 | 7.7 |
| DEBiT-B (Ours), no adapters | No | 60M | 6.8 | 4.0 |
| DEBiT-B (Ours), no adapters | CroCo + RPEV | 60M | 83.0 | 55.6 |

Table 4 shows experimental comparisons for example end-to-end navigation models with example perception modules (DEBiT-B; DEBiT-L) and an Active Neural SLAM model adapted to include the (DEBiT-L) binocular encoder (without the additional monocular encoder) with the Siamese baseline.

| Method | enc.weights | #steps | SR (%) | SPL (%) |
|---|---|---|---|---|
| DEBiT-L | frozen | 200M | 82.0 | 59.6 |
| DEBiT-B | frozen | 200M | 83.0 | 55.6 |
| Siam. hwRN18 | from-scratch | 180M | 10.1 | 9.6 |
| Siam. hwRN18 [49][5] | from-scratch | 500M | — | 8.0 |
| ANS + DEBIT-L | frozen | | 32.0 | 15.0 |

Additional experiments demonstrated largely improved performance over Siamese baselines even with variations in model capacity (number of heads or dimensions) fps for training (e.g., 120 or 75 fps vs. 450 fps for a Siamese baseline), and for different numbers of training steps (e.g., 30M, 100M).

Figure 6:
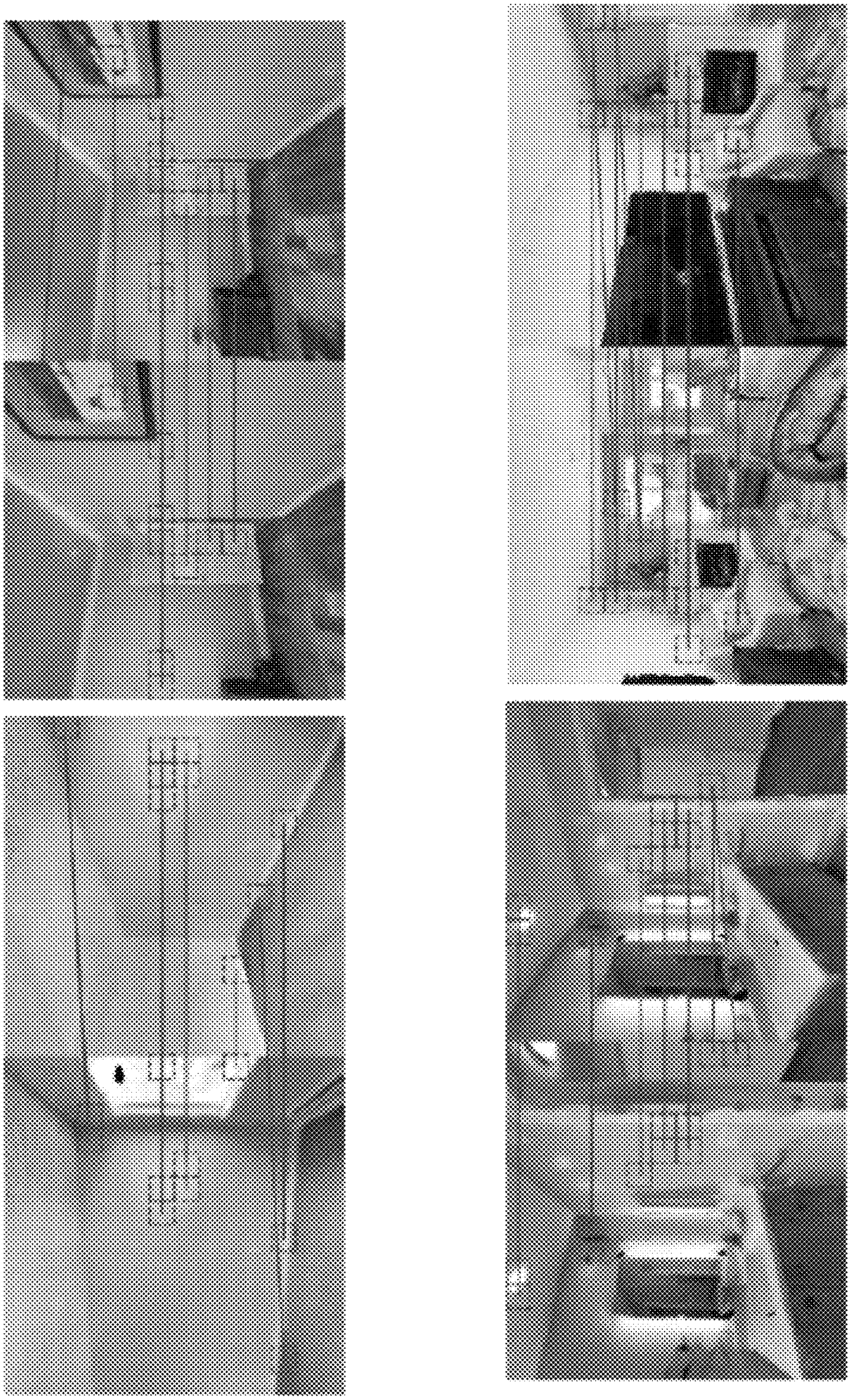
FIGS. 6-7 show a visualization of a decoder cross-attention of an example fine-tuned model (DEBiT-L) for example image pairs, illustrating emergence of correspondence from pretraining, where
Figure 7:
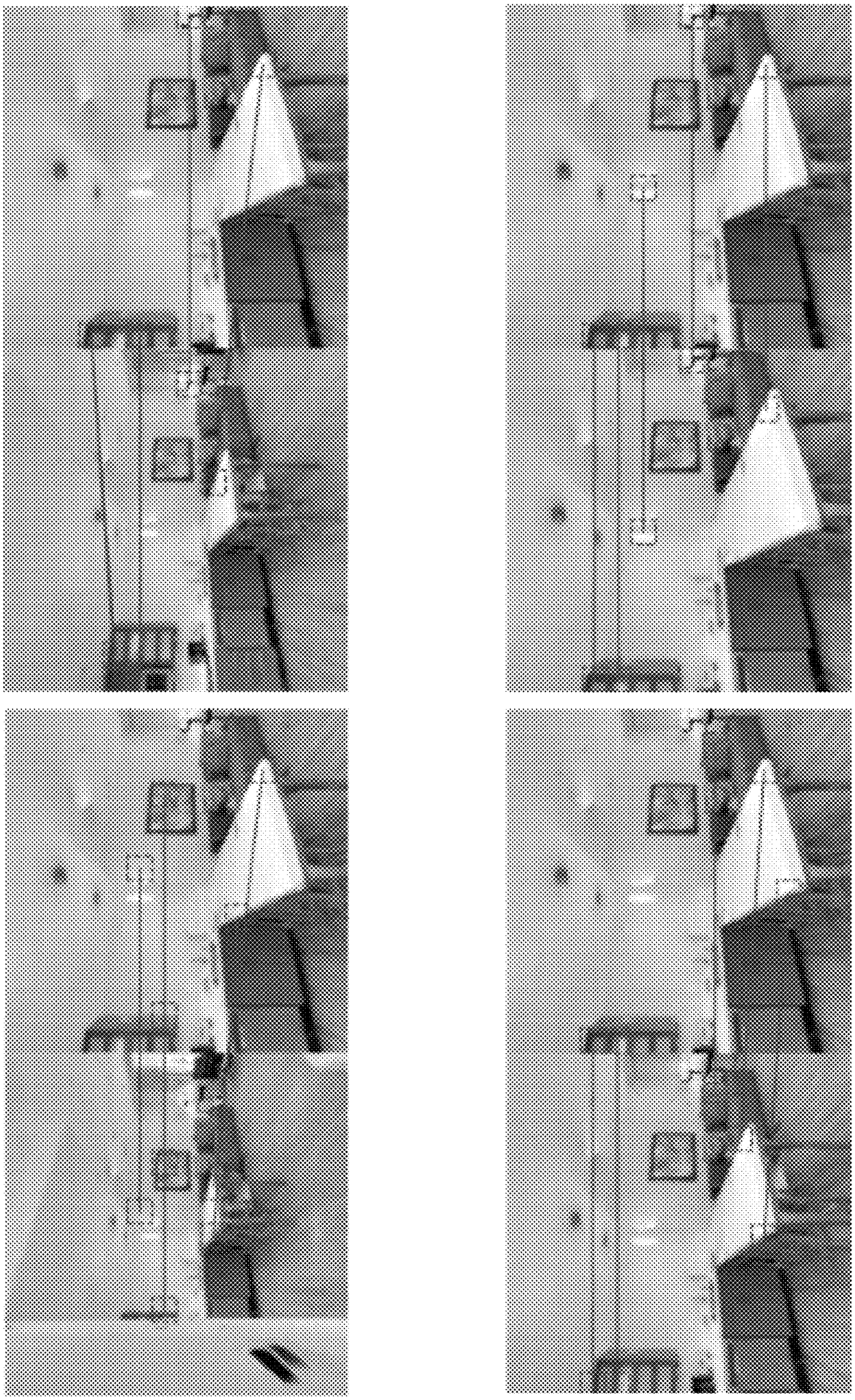

FIGS. 6-7 show a visualization of a decoder cross-attention of an example fine-tuned model (DEBiT-L) for example image pairs, illustrating emergence of correspondence from pretraining. The visualizations show attention of the last layer averaged over heads. FIG. 6 shows different scenes and poses, while FIG. 7 shows image pairs taken from a single trajectory, varying distance to the goal, illustrating robustness to scale changes. As illustrated, correspondence solutions naturally emerge without explicit supervision of correspondence solutions.

Figure 8A:
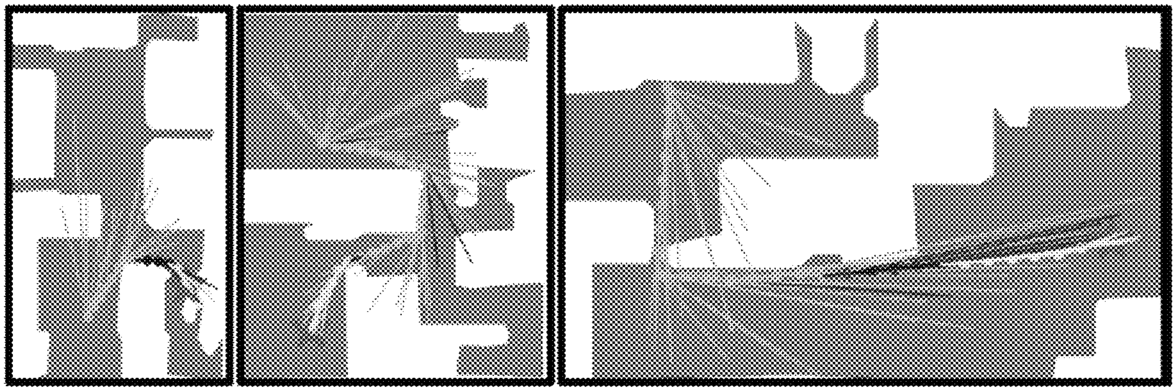
FIGS. 8A-8B show an example of pose and visibility (RPEV) performances (for visualization only) for a model (DEBiT-L) provided via an RPEV head on several expert trajectories.
Figure 8B:
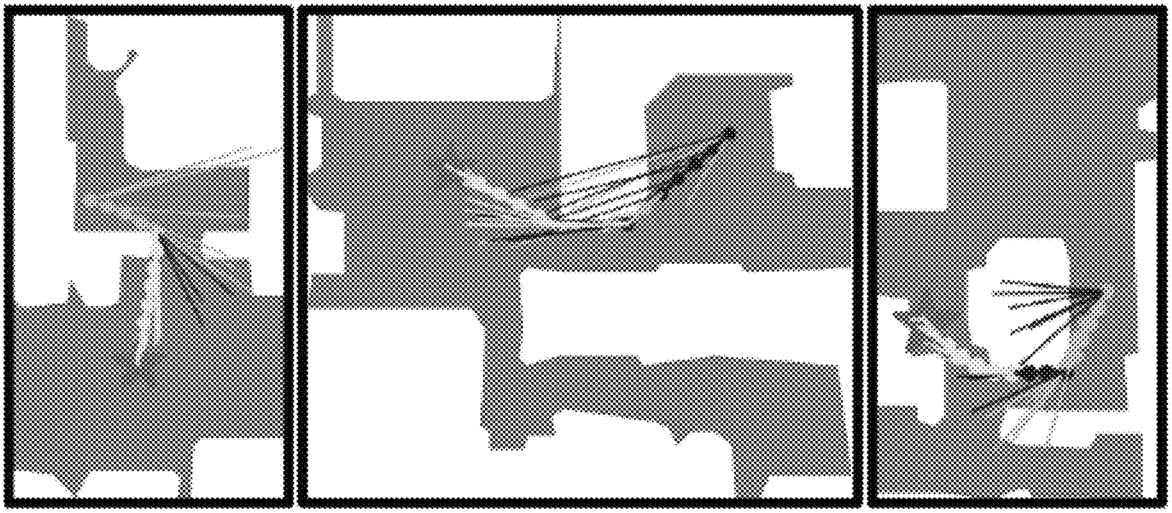

FIGS. 8A-8B show an example of pose and visibility (RPEV) performances (for visualization only) for a model (DEBiT-L) provided via an RPEV head on several expert trajectories, i.e., during expert episodes, including a goal (star) and segments pointing to the predicted goal, where the shade encodes visibility prediction v and ground truth v* for thresholds τ indicating: true negatives (TN) ($v^*<\tau$, $v<\tau$); true positives (TP)($v^*>\tau$, $v>\tau$); false positives (FP) ($v^*<\tau$, $v>\tau$); and false negatives (FN) ($v^*>\tau$, $v<\tau$) (rare, not seen). As illustrated, the example RPEV reliably detects the goal and provides orientations toward it. The RPEV head may be discarded after pretraining, and the information may be passed to the navigation policy indirectly through latent embeddings, or may be provided as other output.

Example systems and methods introduce pretext tasks and a dual visual encoder for ImageGoal navigation in 3D environments. The dual visual encoder provides rich geometric information and can operate in a mono-view setting with end-to-end trained models. By decomposing the correspondence problem into multiple training stages via pretext tasks, solutions can emerge without explicit supervision. Example dual visual encoders and perception modules can be integrated into a modular navigation pipeline.

Example applications include autonomous agents for performing tasks such as, but not limited to, guiding customers in locations such as shopping centers, museums, hospitals, offices, event locations, etc., delivering parcels, or others. Example systems and methods can provide improvement in navigation capabilities of autonomous agents.

Figure 9:
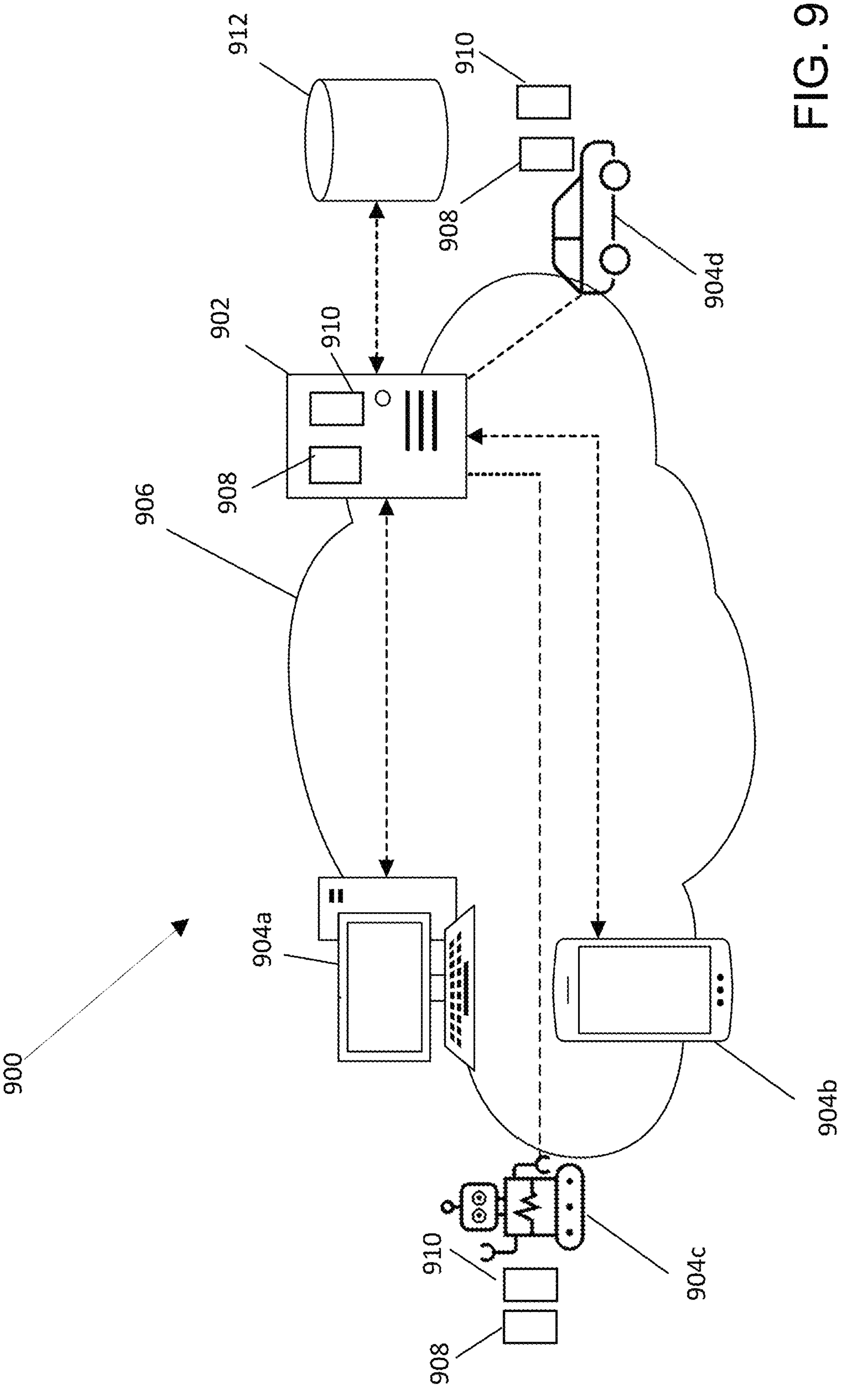
FIG. 9 shows an example architecture that may be used for example systems and methods.

Example systems, methods, and embodiments may be implemented within an architecture 900 or a portion thereof such as illustrated in FIG. 9. The architecture 900 comprises a server 902 and one or more devices such as devices 904. The devices 904 may operate as client devices and may communicate over a network 906 which may be wireless and/or wired, such as the Internet, for data exchange, or may operate as standalone devices (or even disconnected from the server 902 entirely).

The server 902 and the devices 904 can each include a processor, e.g., processor 908, and a memory, e.g., memory, such as but not limited to random-access memory (RAM), read-only memory (ROM), hard disks, solid state disks, or other non-volatile storage media. Memory 910 may also be provided in whole or in part by external storage in communication with the processor 908.

The navigation architecture 100, 300, 1100 (described below), for instance, may be provided in the server 902 and/or one or more of the devices 904. In some example embodiments, the navigation architecture 100, 300, 1100 is provided in the devices 904, possibly without the training module 130, and the training module 130 is provided in the devices 904 and/or the server 902. In other example embodiments, the server 902 trains the navigation architecture 100, 300, 1100 or pretrains a modular binocular encoder 116, 304 offline, online, or a combination of offline and online, and the navigation architecture is then provided in the devices, or the pretrained binocular encoder is integrated into a navigation architecture in the devices and end-to-end trained.

It will be appreciated that the processor 908 in the server 902 or devices 904 can include either a single processor or multiple processors operating in series or in parallel, and that the memory 910 in the server or the devices can include one or more memories, including combinations of memory types and/or locations. Server 902 may also include, but are not limited to, dedicated servers, cloud-based servers, or a combination (e.g., shared). Storage, e.g., a database, may be embodied in suitable storage in the server 902, device 904, a connected remote storage 912 (shown in connection with the server 902, but can likewise be connected to client devices), or any combination.

Devices 904 may be any processor-based device, terminal, etc., and/or may be embodied in an application executable by a processor-based device, etc. Example devices include, but are not limited to, autonomous devices. Devices 904 may operate as clients and be disposed within the server 902 and/or external to the server (local or remote, or any combination) and in communication with the server, or may operate as standalone devices, or a combination.

Example devices 904 include, but are not limited to, autonomous computers 904*a*, mobile communication devices (e.g., smartphones, tablet computers, etc.) 904*b*, robots 904*c*, autonomous vehicles 904*d*, wearable devices, virtual reality, augmented reality, or mixed reality devices (not shown), or others. Devices 904 communicating with the server 902 may be configured for sending data to and/or receiving data from the server. Devices may include, but need not include, one or more input devices, such as image capturing devices, and/or output devices, such as for communicating, e.g., transmitting, actions determined through navigation methods. Devices may include combinations of client devices.

In example training methods, the server 902 or devices 904 may receive a dataset from any suitable source, e.g., from memory 910 (as nonlimiting examples, internal storage, an internal database, etc.), from external (e.g., remote) storage 912 connected locally or over the network 906. For navigation training, devices 904 may receive images such as observation images from one or more image-capturing devices, such as cameras (e.g., RGB cameras). The example training methods can generate a trained navigation model or portion thereof (e.g., pretrained binocular encoder) that can be likewise stored in the server (e.g., memory 910), devices 904, external storage 912, or combination. In some example embodiments provided herein, training may be performed offline or online (e.g., at run time), in any combination.

Figure 10:
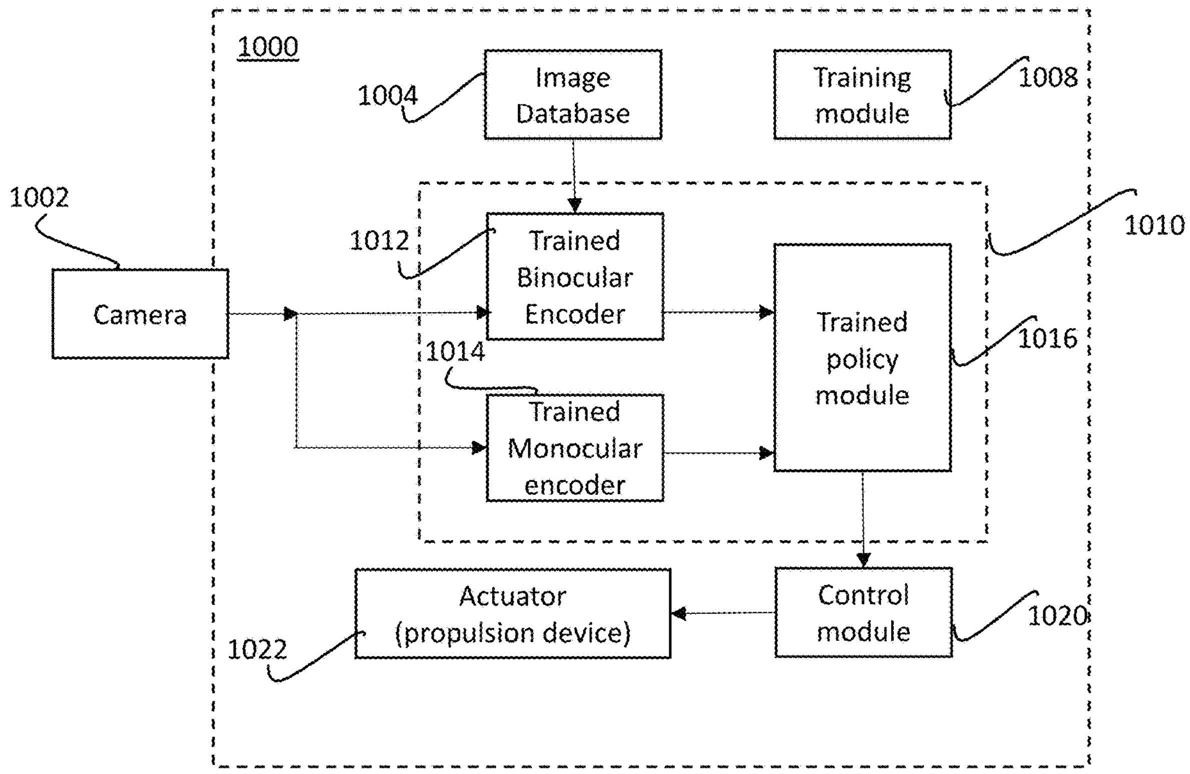
FIG. 10 shows an example navigation system that may be incorporated into a device such as an autonomous apparatus.

FIG. 10 shows an example navigation system 1000 that may be incorporated into a device such as an autonomous apparatus (e.g., vehicle 904*d* or robot 904*c*). The navigation system 1000 may comprise an image-capturing device such as a camera 1002 having an optical sensor, which generates an image of the surroundings of the autonomous apparatus that may provide an observation image at each of a series of time-steps. This image may be a mono-view image. A second image, which may provide a goal image, may be received via any suitable input and stored in a memory such as image database 1004, which may be embodied in memory 910. The stored second image may have been generated by the camera 1002 at an earlier time, or provided as an image that had not previously been obtained by the camera (such as when the device may be navigation to a new goal).

The autonomous apparatus, alone or via communication with another device 904 or server 902, may train, e.g., using training module 1008, a navigation architecture 1010 embodied in a machine learning model for a downstream navigation task according to method 200. The navigation architecture 1010 may include a trained binocular encoder 1012 (e.g., binocular encoders 116, 304, 1104), a trained monocular encoder 1014 (e.g., monocular encoder 118, 306, 1116), a trained navigation policy module 1016 (e.g., navigation policy models 114, 308, 1114), and optionally one or more adaptors 1102. Alternatively, the autonomous apparatus may receive from the server 902 a trained navigation architecture trained by the server, e.g., using training module 130, 302 (or similar model for architecture 1100) or by another device according to method 200, or a binocular encoder pretrained by the server or another device via pretraining 206 and finetuning 208, Updated models including parameters may be stored in memory 910.

The autonomous apparatus may apply the trained task specific machine learning model to one or more images obtained from the camera 1002 and/or from the image database 1004 as needed to extract prediction data from the one or more images according to the navigation task. The autonomous apparatus may then adapt its motion state (e.g., velocity or direction of motion) or its operation based on the extracted prediction data. For example, an action output from the navigation architecture 1010, e.g., from the trained policy module 1016, can be received by a control module (controller) 1020. The control module 1020 is configured to control operation of an actuator 1022, e.g., a propulsion device, to navigate the autonomous apparatus toward the goal indicated by the goal image.

Generally, embodiments can be implemented as computer program products with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor.

Embodiments described herein may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

FIG. 11 illustrates another example navigation architecture 1100 further incorporating adaptors 1102 for adapting a binocular encoder 1104. The binocular encoder 1104 may generally be configured similarly to the binocular encoder 304 in FIG. 3, including twin encoders 1106, 1108 that may generally correspond to twin encoders 310, 312, and a decoder 1110, e.g., a ViT decoder, that may generally correspond to decoder 314, but may be configured and trained according to additional example methods and systems herein.

The adaptors 1102 provide or may be embodied in additional multilayer perceptrons (MLP) for one or more (e.g., each) layer of the binocular encoder 1104, e.g., a ViT. In an example training method, the adaptor 1102 layers are trained, while the layers of the ViT are frozen. In an example training, they get the same input and predict a correction of the binocular encoder 1104 output, which is added to the ViT. In some example architectures 1100, the adaptors 1102 may have different weights for the observation image and for the goal image.

As disclosed, for instance in Chen et al., AdaptFormer: Adapting Vision Transformers for Scalable Visual Recognition, NeurIPS 2022, arxiv:2205.13535, Oct. 15, 2022, a multilayer perceptron (MLP) block in the encoder and/or decoder (e.g., LayerNorm and MLP) can be adapted with adaptor multilayer perceptrons to provide an additional branch including a lightweight module for task-specific fine tuning. The additional lightweight module may be embodied in a bottleneck module including, for instance, a trainable down-projection layer for down projection to a bottleneck middle dimension, and an up-projection layer for up-projection to an output channel dimension, with a nonlinear (e.g., ReLU) layer in-between. As disclosed in Chen et al., for instance, the bottleneck module may be connected to the MLP block in the encoder or the decoder via a residual connection, which may have a scale factor.

In an example training method for the architecture 1100, the binocular encoder 1104, e.g., without the adaptors 1102, may be pretrained on the first pretext task, such as a masked patch reconstruction (e.g., CroCo) task, and may be fine-tuned for the second pretext task, relative pose estimation and visibility (RPEV), using methods such as described herein. The parameters of the pretrained binocular encoder 1104 may then be frozen and the binocular encoder adapted. The adaptors 1102, which may be configured, for instance, such as disclosed in Chen et al., and described above, may be connected to the pretrained binocular encoder 1104, e.g., to the twin encoders 1106, 1108 and/or to the decoder 1110. A fully connected (FC) layer 1112 is also connected to the output of the binocular encoder 1104.

A navigation policy model 1114 and a monocular encoder 1116 are also connected to the binocular encoder 1104. The navigation policy model 1114 and the monocular encoder 1116, for example, may be configured similarly to the navigation policy model 308 and monocular encoder 306.

The navigation architecture 1100 is then trained (e.g., end-to-end) on a downstream visual navigation task, such as disclosed herein, e.g., with RL, imitation learning, etc., to train from scratch the adaptors 1102 adapting the binocular encoder 1104 (e.g., the twin encoders 1106, 1108 and the decoder 1110), the fully connected layer 1112, the monocular encoder 1116, and the navigation policy model 1114, while the layers of the pretrained binocular encoder 1104 otherwise remain frozen. The example downstream task training may be performed as described herein.

Example navigation architectures 1100 and associated training methods having adaptors 1102 can extend navigation capability of a navigation architecture, even for visual navigation tasks where the goal and observation images are acquired from different image sources (e.g., so-called Instance-ImageNav tasks), e.g., having different camera intrinsics (e.g., focal lengths), different positions on the agent (e.g., height), etc. Such navigation problems have which previously been too difficult or impossible to address using conventional architectures and training methods, due to the additional complexity of the problem. The adaptors 1102 can be trained to account for such differences. In experiments using an example trained (including adapted) navigation architecture such as navigation architecture 1100, a 60.6% SR and 33.2% SPL has been achieved for 200M training steps.

Embodiments herein provide, among other things, a computer-implemented machine learning method for training a navigation model on a goal-oriented visual navigation task, the method comprising: by one or more processors, pretraining a binocular encoder on a first pretext task comprising a masked patch reconstruction task between first images and second images, the first images being masked, the binocular encoder including first and second twin encoders and a binocular decoder that is connected to the first and second twin encoders, wherein the first twin encoder encodes the first image, the second twin encoder encodes the second image, and the binocular encoder provides an output based on the encoded first and second images, by one or more processors, finetuning the binocular encoder on a second pretext task comprising a relative pose estimation and a visibility prediction, wherein the first twin encoder encodes an observation image as the first image and the second twin encoder encodes a goal image as the second image; combining the finetuned binocular encoder with an additional monocular visual encoder and with a navigation policy module in the navigation model, wherein the navigation policy module receives the output from the binocular encoder and a representation from the additional monocular encoder; by one or more processors, end-to-end training the navigation model on a downstream visual navigation task to train at least the navigation policy module and the additional monocular encoder, wherein the first twin encoder encodes the observation image as the first image and the second twin encoder encodes the goal image as the second image. In combination with any of the above features in this paragraph, the first pretext task may comprise a cross-view completion task. In combination with any of the above features in this paragraph, the monocular encoder may receive the first image, and the navigation policy module may receive an embedded first image from the monocular encoder; wherein the monocular encoder receives the observation image as the first image. In combination with any of the above features in this paragraph, each of the first and second twin encoders may be embodied in a monocular encoder. In combination with any of the above features in this paragraph, the first and second twin encoders may use self-attention on the first and second images, respectively, and the decoder may use cross-attention between the first and second images. In combination with any of the above features in this paragraph, the first pretext task may comprise a cross-view completion task, wherein during pretraining one of the first and second image in each image pair is partially masked and the other image in the image pair is unmasked. In combination with any of the above features in this paragraph, during training, the first and second images in each image pair may be images of the same scene taken at a different time or from a different vantage point. In combination with any of the above features in this paragraph, the decoder may comprise a binocular transformer decoder. In combination with any of the above features in this paragraph, the decoder may comprise a binocular Vision Transformer (ViT) decoder. In combination with any of the above features in this paragraph, the binocular encoder may comprise a large-capacity binocular Vision Transformer (ViT). In combination with any of the above features in this paragraph, the output from the binocular encoder may comprise a perception embedding. In combination with any of the above features in this paragraph, the pretraining may use self-supervised learning. In combination with any of the above features in this paragraph, the navigation policy module and the monocular encoder may be trained for the visual navigation task using reinforcement learning or imitation learning. In combination with any of the above features in this paragraph, the monocular encoder may receive the first image, and the navigation policy module may receive an embedded first image from the monocular encoder; the monocular encoder may receive the observation image as the first image; and the navigation policy module may learn a recurrent policy, wherein the recurrent policy maintains a memory of previous states, and the recurrent policy predicts an action based on the output from the binocular encoder and the representation from the monocular encoder. In combination with any of the above features in this paragraph, the navigation policy module may learn an attention-based policy. In combination with any of the above features in this paragraph, said training of the binocular encoder on the first pretext task and/or the end-to-end training may be performed offline, online, or a combination. In combination with any of the above features in this paragraph, the end-to-end training may be performed offline, online, or a combination. In combination with any of the above features in this paragraph, the monocular encoder may receive the first image, and the navigation policy module may receive an embedded first image from the monocular encoder; the monocular encoder may receive the observation image as the first image; and the monocular encoder may comprise a model that is one-half or less of a size of the models for the first or second twin encoder. In combination with any of the above features in this paragraph, each of the first and second images may be mono-view, two-dimensional images. In combination with any of the above features in this paragraph, each of the first and second images may be images other than panoramic images. In combination with any of the above features in this paragraph, the first pretext task may comprise a cross-view completion task; wherein during the training on the visual navigation task, the first and second images are simulated images. In combination with any of the above features in this paragraph, the first and second images may be RGB images including a depth component. In combination with any of the above features in this paragraph, the first and second images are RGB images may lack a depth component. In combination with any of the above features in this paragraph, during the end-to-end training, the first and second images may be taken from the same image-capturing device. In combination with any of the above features in this paragraph, during the end-to-end training, the first and second images may be taken from respectively different image-capturing devices. In combination with any of the above features in this paragraph, during the end-to-end training, the second image may comprise a goal image that is stored in memory, and the first image may be taken from an image-capturing device. In combination with any of the above features in this paragraph, the visibility prediction may be linked to a capacity of an agent to determine whether to explore or to exploit. In combination with any of the above features in this paragraph, the visibility prediction may be a binary output. In combination with any of the above features in this paragraph, the visibility prediction may be a continuous output. In combination with any of the above features in this paragraph, the relative pose estimation may comprise a relative translation estimation and a relative rotation estimation. In combination with any of the above features in this paragraph, the second pretext task may comprise wide-baseline relative pose estimation. In combination with any of the above features in this paragraph, the second pretext task may comprise extremely wide-baseline relative pose estimation and visibility. In combination with any of the above features in this paragraph, the finetuning may use a dataset include a plurality of image pairs including first images and second images; wherein in at least one of the plurality of image pairs, the first and second images do not overlap. In combination with any of the above features in this paragraph, the monocular encoder may receive the first image, and the navigation policy module may receive an embedded first image from the monocular encoder; wherein the monocular encoder receives the observation image as the first image; and wherein said training the monocular encoder and the connected navigation policy model on a downstream visual navigation task further finetunes one or more upper layers of the finetuned binocular encoder. In combination with any of the above features in this paragraph, the monocular encoder may receive the first image, and the navigation policy module may receive an embedded first image from the monocular encoder; the monocular encoder may receive the observation image as the first image; and during said training the monocular encoder and the connected navigation policy model on a downstream visual navigation task, layers of the finetuned binocular encoder that are not finetuned may be frozen. In combination with any of the above features in this paragraph, the monocular encoder may receive the first image, and the navigation policy module may receive an embedded first image from the monocular encoder; the monocular encoder may receive the observation image as the first image; and during said training the monocular encoder and the connected navigation policy model the finetuned binocular encoder may be frozen. In combination with any of the above features in this paragraph, said fine-tuning the binocular encoder on the second pretext task may comprise adding a relative pose estimation and visibility (RPEV) head to the binocular encoder for determining the relative pose estimation and the visibility prediction. In combination with any of the above features in this paragraph, the RPEV head may be removed from the finetuned binocular encoder before said combining the finetuned binocular encoder with the navigation policy module. In combination with any of the above features in this paragraph, during said training the monocular encoder and the connected navigation policy model on a downstream visual navigation task, one or more layers of the binocular encoder may be adapted by one or more adaptors. In combination with any of the above features in this paragraph, each of the one or more adapters may comprise an additional residual multi-layer perceptron. In combination with any of the above features in this paragraph, during said training the monocular encoder and the connected navigation policy model on a downstream visual navigation task the additional residual multi-layer perceptron may be trained while the parameters of the pretrained binocular encoder are frozen. In combination with any of the above features in this paragraph, during said training the monocular encoder and the connected navigation policy model on a downstream visual navigation task, the first and second images may be taken from different image sources. In combination with any of the above features in this paragraph, the first and second images may be taken from cameras having different camera intrinsics. In combination with any of the above features in this paragraph, the first and second images may be taken from different positions. In combination with any of the above features in this paragraph, the navigation policy module may comprise a scene reconstruction module and a planning module. In combination with any of the above features in this paragraph, the navigation policy module may comprise a simultaneous localization and mapping (SLAM) module. In combination with any of the above features in this paragraph, the navigation policy module may determine whether to use a global policy and a local policy (global+local policy) or a local policy to determine an action based on an output of the binocular encoder. In combination with any of the above features in this paragraph, the output of the binocular encoder may comprise a visibility estimation, and the determination of whether to use a global+local policy or a local policy to determine the action may be based on whether the visibility estimation exceeds or meets a threshold. In combination with any of the above features in this paragraph, the goal-oriented visual navigation task may output an action for navigating an agent that receives the observation image to a location in a three-dimensional environment indicated by the goal image. In combination with any of the above features in this paragraph, the navigation model may output an action, and the action may be selected from a set of possible actions comprising one or more of: move forward a predetermined distance, turning left a predetermined rotational amount, turning right a predetermining rotational amount, and stopping. In combination with any of the above features in this paragraph, the navigation model may output an action, and the action may be selected from a set of possible actions comprising one or more of: moving a predetermined distance and/or velocity, turning a predetermined rotational amount and/or velocity, and stopping. In combination with any of the above features in this paragraph, the navigation model may be incorporated into an autonomous device. In combination with any of the above features in this paragraph, the autonomous device may be a robot. In combination with any of the above features in this paragraph, the robot may further comprise: an actuator; at least one image capturing device for obtaining at least the first image; and a controller that receives a determined action from the navigation model and controls the actuator.

Further embodiments herein may provide, among other things, an apparatus for training a navigation model on a goal-oriented visual navigation task comprising: a non-transitory computer-readable medium having executable instructions stored thereon for causing a processor and a memory to perform a method according to the previous paragraph.

Further embodiments provide, among other things, a navigation architecture for a goal-oriented visual navigation task implemented by one or more processors that outputs an action for navigating an agent that receives an observation image to a location in a three-dimensional environment indicated by a goal image, the architecture comprising: a binocular encoder comprising: first and second twin encoders; and a binocular decoder that is connected to the first and second twin encoders, wherein the first twin encoder encodes a first image, the second twin encoder encodes a second image, and the binocular encoder provides an output based on the encoded first and second images; a navigation policy module connected to said binocular encoder that receives the output from the binocular encoder and outputs an action; wherein said binocular encoder is pretrained on a first pretext task comprising a masked patch reconstruction task between image pairs of first images and second images, wherein the first images are masked; wherein said binocular encoder is finetuned on a second pretext task comprising a relative pose estimation between the first and second images and a visibility prediction, wherein the first twin encoder encodes the observation image as the first image and the second twin encoder encodes the goal image as the second image; and wherein said navigation policy module with the connected binocular encoder is trained end-to-end on a downstream visual navigation task, wherein the first twin encoder encodes the observation image as the first image and the second twin encoder encodes the goal image as the second image. In combination with any of the above features in this paragraph, the architecture may further comprise a monocular encoder connected to said navigation policy module, wherein the monocular encoder receives the first image, and the navigation policy module receives an embedding from the monocular encoder; wherein said monocular encoder may be trained during the end-to-end training of the navigation policy module, and the monocular encoder receives the observation image as the first image. In combination with any of the above features in this paragraph, the architecture may further comprise a training module configured to train said binocular encoder on the first and second pretext tasks and configured to end-to-end train said monocular encoder and said navigation policy module. In combination with any of the above features in this paragraph, the architecture may further comprise a training module configured to train said binocular encoder on the first and second pretext tasks. In combination with any of the above features in this paragraph, the masked patch reconstruction task may be a cross-view completion task. In combination with any of the above features in this paragraph, each of the first and second twin encoders may be embodied in a monocular encoder. In combination with any of the above features in this paragraph, the first and second twin encoders may use self-attention on the first and second images, respectively, and the decoder may use cross-attention between the first and second images. In combination with any of the above features in this paragraph, the decoder may comprise a binocular transformer decoder. In combination with any of the above features in this paragraph, the decoder may comprise a binocular Vision Transformer (ViT) decoder. In combination with any of the above features in this paragraph, the binocular encoder may comprise a large-capacity binocular Vision Transformer (ViT). In combination with any of the above features in this paragraph, the binocular encoder may be trained for the first pretext task using self-supervised learning. In combination with any of the above features in this paragraph, the architecture may further comprise a monocular encoder connected to said navigation policy module, the monocular encoder may receive the first image, the navigation policy module may receive an embedding from the monocular encoder, the monocular encoder may be trained during the end-to-end training of the navigation policy module, the monocular encoder may receive the observation image as the first image; and the navigation policy module and the monocular encoder may be trained for the visual navigation task using reinforcement learning or imitation learning. In combination with any of the above features in this paragraph, the navigation policy module may learn a recurrent policy, wherein the recurrent policy maintains a memory of previous states, and the recurrent policy may predict an action based on the latent visual representation from the binocular encoder and the second embedding from the monocular encoder. In combination with any of the above features in this paragraph, the pretraining of the binocular encoder on the first pretext task may be performed offline and the end-to-end training may be performed online. In combination with any of the above features in this paragraph, the pretraining and the finetuning of the binocular encoder may be performed offline and the end-to-end training may be performed online. In combination with any of the above features in this paragraph, the pretraining and/or the finetuning of the binocular encoder may be performed offline, online, or a combination, and the end-to-end training may be performed offline, online, or a combination. In combination with any of the above features in this paragraph, the architecture may further comprise a monocular encoder connected to said navigation policy module, the monocular encoder may receive the first image, and the navigation policy module may receive an embedding from the monocular encoder; the monocular encoder may be trained during the end-to-end training of the navigation policy module, the monocular encoder may receive the observation image as the first image; and the monocular encoder may comprise a model that is one-half or less of a size of the models for the first or second twin encoder. In combination with any of the above features in this paragraph, each of the first and second images may be mono-view, two-dimensional images. In combination with any of the above features in this paragraph, each of the first and second images may be images other than panoramic images. In combination with any of the above features in this paragraph, the first and second images may be RGB images. In combination with any of the above features in this paragraph, during the training on the visual navigation task, the first and second images may be taken from the same image-capturing device. In combination with any of the above features in this paragraph, during the training on the visual navigation task, the first and second images may be taken from respectively different image-capturing devices. In combination with any of the above features in this paragraph, the architecture may further comprise a memory for storing a goal image; wherein during the training on the downstream visual navigation task, the second image may be stored in the memory, and the first images may be taken from an image-capturing device. In combination with any of the above features in this paragraph, the visibility prediction may be linked to a capacity of the agent to determine whether to explore or to exploit. In combination with any of the above features in this paragraph, the visibility prediction may be a binary output. In combination with any of the above features in this paragraph, the visibility prediction may be a continuous output. In combination with any of the above features in this paragraph, the relative pose estimation may comprise a relative translation estimation and a relative rotation estimation. In combination with any of the above features in this paragraph, the finetuning may use a dataset include a plurality of image pairs including first images and second images; wherein in at least one of the plurality of image pairs, the first and second images do not overlap. In combination with any of the above features in this paragraph, the architecture may further comprise a monocular encoder connected to said navigation policy module, wherein the monocular encoder receives the first image, and the navigation policy module receives an embedding from the monocular encoder; the monocular encoder may be trained during the end-to-end training of the navigation policy module, the monocular encoder may receive the observation image as the first image; and the monocular encoder may output a representation of the observation image to the connected navigation policy model. In combination with any of the above features in this paragraph, the architecture may further comprise at least one adaptor coupled to said binocular encoder; wherein, when the navigation policy module is trained end-to-end on a downstream visual navigation task, layers of the at least one adaptor may be updated while layers of the binocular encoder are frozen. In combination with any of the above features in this paragraph, the navigation policy module may comprise a gated recurrent unit (GRU). In combination with any of the above features in this paragraph, the navigation policy module may comprise a scene reconstruction module and a planning module. In combination with any of the above features in this paragraph, the navigation policy module may comprise a simultaneous localization and mapping (SLAM) module. In combination with any of the above features in this paragraph, the output of the binocular encoder may comprise a visibility, and the determination of whether to use a global+local policy or a local policy to determine the action may be based on whether the visibility exceeds or meets a threshold. In combination with any of the above features in this paragraph, the navigation model may output an action that is selected from a set of possible actions comprising: moving a predetermined distance, turning a predetermined rotational amount, and stopping. In combination with any of the above features in this paragraph, the agent may be incorporated into an autonomous device. In combination with any of the above features in this paragraph, the autonomous device may be a robot. In combination with any of the above features in this paragraph, an autonomous device may comprise: an architecture according to any of the above features in this paragraph: an actuator; at least one image capturing device for obtaining at least the first image; and a control module that receives a determined action from the navigation architecture and controls the actuator.

Further embodiments provide, among other things, a computer-implemented machine learning method for training a navigation model on a goal-oriented visual navigation task, the method comprising: by one or more processors, pretraining a binocular encoder on a pretext task comprising a masked patch reconstruction task between first images and second images, wherein the first images are masked; the binocular encoder including first and second twin encoders and a binocular decoder that is connected to the first and second twin encoders, wherein the first twin encoder encodes the first image, the second twin encoder encodes the second image, and the binocular encoder provides an output based on the encoded first and second images; combining the binocular encoder with a navigation policy module downstream of the binocular encoder in the navigation model; connecting one or more adaptors to the binocular encoder; freezing parameters of the binocular encoder; and by one or more processors, end-to-end training the navigation model on a downstream visual navigation task to train at least the one or more adaptors and the navigation policy module, wherein the first twin encoder encodes an observation image, and wherein the second twin encoder encodes a goal image. In combination with any of the above features in this paragraph, the one or more adaptors may be trained to predict a correction of the output of the binocular encoder. In combination with any of the above features in this paragraph, the method may further comprise further coupling an additional monocular visual encoder upstream of the navigation policy module in the navigation model; wherein said end-to-end training the navigation model may further train the additional monocular encoder; and wherein both the additional monocular encoder and the first twin encoder may encode the observation image. In combination with any of the above features in this paragraph, the one or more adaptors may be connected at least to the first twin encoder and to the second twin encoder; and wherein the one or more adaptors may be further connected to the binocular decoder.

Further embodiments herein provide a navigation architecture for a goal-oriented visual navigation task implemented by one or more processors that outputs an action for navigating an agent that receives an observation image to a location in a three-dimensional environment indicated by a goal image, the architecture comprising: a binocular encoder comprising: first and second twin encoders, and a binocular decoder that is connected to the first and second twin encoders, wherein the first twin encoder encodes a first image, the second twin encoder encodes a second image, and the binocular encoder provides an output based on the encoded first and second images; a navigation policy module connected to said binocular encoder that receives the output from the binocular encoder and outputs an action; and one or more adaptors connected to the binocular encoder; wherein said binocular encoder is pretrained on a pretext task comprising a masked patch reconstruction task between image pairs of first images and second images, wherein the first images are masked; wherein said navigation policy module with the connected binocular encoder is trained end-to-end on a downstream visual navigation task to train at least said navigation policy module and said one or more adaptors while said binocular encoder is frozen, wherein the first twin encoder and said monocular encoder each encode the observation image as the first image and the second twin encoder encodes the goal image as the second image. In combination with any of the above features in this paragraph, the architecture may further comprise a fully connected layer disposed downstream of the binocular encoder; wherein the end-to-end training the navigation model may further train the fully connected layer. In combination with any of the above features in this paragraph, the architecture may further comprise an additional monocular encoder connected to said navigation policy module, wherein the additional monocular encoder receives the first image, and the navigation policy module receives an embedding from the additional monocular encoder; wherein the first twin encoder and said additional monocular encoder may each encode the observation image as the first image; wherein the training end-to-end on a downstream visual navigation task may further train said additional monocular encoder; and wherein the one or more adaptors may be connected at least to the first twin encoder and to the second twin encoder.

Further embodiments herein provide an autonomous apparatus, comprising: an actuator for navigating; an image-capturing device for capturing an observation image; and a control module configured to control operation of the actuator with actions to navigate to a location in a three-dimensional environment indicated by a goal image; wherein the control module further comprises: (i) a binocular encoder with a first twin encoder for encoding the observation image and a second twin encoder for encoding the goal image; (ii) a binocular decoder connected to the first and second twin encoders of the binocular encoder; and (iii) a navigation policy module that receives output from the binocular decoder and outputs an action to control operation of the actuator for navigating; wherein the control module is trained such that: (i) the binocular encoder is trained on a first pretext task comprising a masked patch reconstruction task between image pairs of goal images and masked observation images; (ii) the binocular decoder is trained to decode learned representations of the masked patch reconstruction task; and (iii) the navigation policy module is trained on actions to control operation of the actuator for navigating; and wherein the control module is further trained such that, one or more of: (i) the binocular decoder is trained on a second pretext task comprising a relative pose estimation between the observation image and the goal image and a visibility prediction; and (ii) a layer of the binocular encoder or decoder is adapted by one or more adaptors.

Further embodiments herein provide a navigation architecture for a goal-oriented visual navigation task implemented by one or more processors that outputs actions for navigating an agent that receives an observation image to a location in a three-dimensional environment indicated by a goal image, the architecture comprising: a binocular encoder with a first twin encoder for encoding the observation image and a second twin encoder for encoding the goal image; a binocular decoder connected to the first and second twin encoders of the binocular encoder; and a navigation policy module that receives output from the binocular decoder and outputs an action for navigating; wherein: (i) the binocular encoder is trained on a first pretext task comprising a masked patch reconstruction task between image pairs of goal images and masked observation images; (ii) the binocular decoder is trained to decode learned representations of the masked patch reconstruction task; and (iii) the navigation policy module is trained on actions for navigating; wherein, one or more of: (i) the binocular decoder is trained on a second pretext task comprising a relative pose estimation between the observation image and the goal image and a visibility prediction; and (ii) a layer of the binocular encoder or decoder is adapted by one or more adaptors.

Further embodiments herein provide an autonomous apparatus, comprising: an actuator for navigating; an image-capturing device for capturing an observation image; and a control module configured to control operation of the actuator with actions to navigate to a location in a three-dimensional environment indicated by a goal image; wherein the control module further comprises: (i) a binocular encoder with a first twin encoder for encoding the observation image and a second twin encoder for encoding the goal image; (ii) a binocular decoder connected to the first and second twin encoders of the binocular encoder; and (iii) a navigation policy module that receives output from the binocular decoder and outputs an action to control operation of the actuator for navigating; wherein the control module is trained such that: (i) the binocular encoder is trained on one or more pretext tasks for learning correspondence solutions for providing goal directional information; (ii) the binocular decoder is trained to decode learned correspondence solutions and provide goal directional information; and (iii) the navigation policy module is trained on actions to control operation of the actuator for navigating using the goal directional information. In combination with any of the above features in this paragraph, the one or more pretext tasks may comprise one or more of a first pretext task comprising a masked patch reconstruction task between image pairs of goal images and masked observation images and a second pretext task comprising relative pose estimation between the observation image and the goal image and a visibility prediction. In combination with any of the above features in this paragraph, one or more layers of the binocular encoder or decoder may be adapted by one or more adaptors.

Further embodiments provide a navigation architecture for a goal-oriented visual navigation task implemented by one or more processors that outputs actions for navigating an agent that receives an observation image to a location in a three-dimensional environment indicated by a goal image, the architecture comprising: a binocular encoder with a first twin encoder for encoding the observation image and a second twin encoder for encoding the goal image; a binocular decoder connected to the first and second twin encoders of the binocular encoder; and a navigation policy module that receives output from the binocular decoder and outputs an action for navigating; wherein the binocular encoder is trained on one or more pretext tasks for learning correspondence solutions for providing goal directional information; wherein the binocular decoder is trained to decode learned correspondence solutions and provide goal directional information; and wherein the navigation policy module is trained on actions to control operation of the actuator for navigating using the goal directional information. In combination with any of the above features in this paragraph, the one or more pretext tasks may comprise one or more of a first pretext task comprising a masked patch reconstruction task between image pairs of goal images and masked observation images and a second pretext task comprising relative pose estimation between the observation image and the goal image and a visibility prediction. In combination with any of the above features in this paragraph, one or more layers of the binocular encoder or decoder may be adapted by one or more adaptors.

General

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. All publications, patents, and patent applications referred to herein are hereby incorporated by reference in their entirety, without an admission that any of such publications, patents, or patent applications necessarily constitute prior art.

It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between features (e.g., between modules, circuit elements, semiconductor layers, etc.) may be described using various terms, such as "connected," "engaged," "coupled," "adjacent," "next to," "on top of," "above," "below," "disposed", and similar terms. Unless explicitly described as being "direct," when a relationship between first and second features is described in the disclosure herein, the relationship can be a direct relationship where no other intervening features are present between the first and second features, or can be an indirect relationship where one or more intervening features are present, either spatially or functionally, between the first and second features, where practicable. As used herein, the phrase "at least one of" A, B, and C or the phrase "at least one of" A, B, or C, should be construed to mean a logical (A OR B OR C), using a non-exclusive logical OR, and should not be construed to mean "at least one of A, at least one of B, and at least one of C."

In the figures, the direction of an arrow, as indicated by an arrowhead, generally demonstrates an example flow of information, such as data or instructions, that is of interest to the illustration. A unidirectional arrow between features does not imply that no other information may be transmitted between features in the opposite direction.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

The invention claimed is:

1. A computer-implemented machine learning method for training a navigation model on a goal-oriented visual navigation task, the method comprising:

by one or more processors, pretraining a binocular encoder on a first pretext task comprising a masked patch reconstruction task between first images and second images, the first images being masked, the binocular encoder including first and second twin encoders and a binocular decoder that is connected to the first and second twin encoders, wherein the first twin encoder encodes the first image, the second twin encoder encodes the second image, and the binocular encoder provides an output based on the encoded first and second images;

by one or more processors, finetuning the binocular encoder on a second pretext task comprising a relative pose estimation and a visibility prediction, wherein the first twin encoder encodes an observation image as the first image and the second twin encoder encodes a goal image as the second image;

combining the finetuned binocular encoder with an additional monocular visual encoder and with a navigation policy module in the navigation model, wherein the navigation policy module receives the output from the binocular encoder and a representation from the additional monocular encoder;

by one or more processors, end-to-end training the navigation model on a downstream visual navigation task to train at least the navigation policy module and the additional monocular encoder, wherein the first twin encoder encodes the observation image as the first image and the second twin encoder encodes the goal image as the second image.

2. The method of claim 1, wherein the first pretext task comprises a cross-view completion task;

wherein during said pretraining the first and second images are provided in image pairs;

wherein during pretraining the first image in each image pair is partially masked and the second image in the image pair is unmasked.

3. The method of claim 1, wherein the first pretext task comprises a cross-view completion task, and wherein the pretraining uses self-supervised learning.

4. The method of claim 1, wherein the navigation policy module and the monocular encoder are trained for the visual navigation task using reinforcement learning or imitation learning.

5. The method of claim 1, wherein during said end-to-end training the monocular encoder receives the observation image as the first image, and the navigation policy module receives an embedded first image from the monocular encoder;

wherein the navigation policy module learns a recurrent policy, the recurrent policy maintains a memory of previous states, and the recurrent policy predicts an action based on the output from the binocular encoder and the representation from the monocular encoder.

6. The method of claim 1, wherein during said end-to-end training one or more layers of the monocular encoder and/or the finetuned binocular encoder are frozen.

7. The method of claim 1, further comprising:

combining a relative pose estimation and visibility (RPEV) head with the binocular encoder for said fine-tuning the binocular encoder on the second pretext task for determining the relative pose estimation and the visibility prediction;

removing the RPEV head from the finetuned binocular encoder after said finetuning; and combining the finetuned binocular encoder with one or more adapters;

wherein each of the one or more adaptors comprises a residual multi-layer perceptron;

wherein during said end-to-end training the monocular encoder and the connected navigation policy model on a downstream visual navigation task the residual multi-layer perceptron is trained while parameters of the pretrained binocular encoder are frozen.

8. The method of claim 1, wherein during said end-to-end training, one or more layers of the binocular encoder are adapted by one or more adaptors.

9. The method of claim 8, wherein during said end-to-end training one or more layers of the binocular encoder are frozen.

10. The method of claim 1, wherein during said end-to-end training, the first and second images are taken from different image sources, wherein the first and second images are taken from cameras having different camera intrinsics and/or the first and second images are taken from different positions.

11. The method of claim 1, wherein the navigation policy module comprises one of (i) a scene reconstruction module and a planning module and (ii) a simultaneous localization and mapping (SLAM) module.

12. The method of claim 1, wherein the navigation policy module determines whether to use a global policy and a local policy (global+local policy) or a local policy to determine an action based on an output of the binocular encoder; and wherein the output of the binocular encoder comprises a visibility estimation, and the determination of whether to use a global+local policy or a local policy to determine the action is based on whether the visibility estimation exceeds or meets a threshold.

13. The method of claim 1, wherein the goal-oriented visual navigation task outputs an action for navigating an agent that receives the observation image to a location in a three-dimensional environment indicated by the goal image;

wherein the navigation model outputs an action, and wherein the action is selected from a set of possible actions comprising one or more of: move forward a predetermined distance, turning left a predetermined rotational amount, turning right a predetermining rotational amount, and stopping;

wherein the navigation model outputs an action, and wherein the action is selected from a set of possible actions comprising one or more of: moving a predetermined distance and/or velocity, turning a predetermined rotational amount and/or velocity, and stopping.

14. The method of claim 1, wherein the goal-oriented visual navigation task outputs an action for navigating an agent that receives the observation image to a location in a three-dimensional environment indicated by the goal image;

wherein the navigation model is incorporated into an autonomous device;

wherein the autonomous device is a robot; and wherein the robot further comprises:

an actuator;

at least one image capturing device for obtaining at least the first image; and a controller that receives a determined action from the navigation model and controls the actuator.

15. A computer-implemented machine learning method for training a navigation model on a goal-oriented visual navigation task, the method comprising:

by one or more processors, pretraining a binocular encoder on a pretext task comprising a masked patch reconstruction task between first images and second images, wherein the first images are masked;

the binocular encoder including first and second twin encoders and a binocular decoder that is connected to the first and second twin encoders, wherein the first twin encoder encodes the first image, the second twin encoder encodes the second image, and the binocular encoder provides an output based on the encoded first and second images;

combining the binocular encoder with a navigation policy module downstream of the binocular encoder in the navigation model;

connecting one or more adaptors to the binocular encoder;

freezing parameters of the binocular encoder; and by one or more processors, end-to-end training the navigation model on a downstream visual navigation task to train at least the one or more adaptors and the navigation policy module, wherein the first twin encoder encodes an observation image, and wherein the second twin encoder encodes a goal image.

16. The method of claim 15, wherein the one or more adaptors are trained to predict a correction of the output of the binocular encoder.

17. The method of claim 15, wherein the method further comprises:

further coupling an additional monocular visual encoder upstream of the navigation policy module in the navigation model;

wherein said end-to-end training the navigation model further trains the additional monocular encoder; and wherein both the additional monocular encoder and the first twin encoder encode the observation image.

18. An autonomous apparatus, comprising:

an actuator for navigating;

an image-capturing device for capturing an observation image;

a control module configured to control operation of the actuator with actions to navigate to a location in a three-dimensional environment indicated by a goal image;

wherein the control module further comprises: (i) a binocular encoder with a first twin encoder for encoding the observation image and a second twin encoder for encoding the goal image; (ii) a binocular decoder connected to the first and second twin encoders of the binocular encoder; and (iii) a navigation policy module that receives output from the binocular decoder and outputs an action to control operation of the actuator for navigating;

wherein the control module is trained such that: (i) the binocular encoder is trained on a first pretext task comprising a masked patch reconstruction task between image pairs of goal images and masked observation images; (ii) the binocular decoder is trained to decode learned representations of the masked patch reconstruction task; and (iii) the navigation policy module is trained on actions to control operation of the actuator for navigating;

wherein the control module is further trained such that, one or more of: (i) the binocular decoder is trained on a second pretext task comprising a relative pose estimation between the observation image and the goal image and a visibility prediction; and (ii) a layer of the binocular encoder or decoder is adapted by one or more adaptors.

19. An autonomous apparatus, comprising:

an actuator for navigating;

an image-capturing device for capturing an observation image;

a control module configured to control operation of the actuator with actions to navigate to a location in a three-dimensional environment indicated by a goal image;

wherein the control module further comprises: (i) a binocular encoder with a first twin encoder for encoding the observation image and a second twin encoder for encoding the goal image; (ii) a binocular decoder connected to the first and second twin encoders of the binocular encoder; and (iii) a navigation policy module that receives output from the binocular decoder and outputs an action to control operation of the actuator for navigating;

wherein the control module is trained such that: (i) the binocular encoder is trained on one or more pretext tasks for learning correspondence solutions for providing goal directional information; (ii) the binocular decoder is trained to decode learned correspondence solutions and provide goal directional information; and (iii) the navigation policy module is trained on actions to control operation of the actuator for navigating using the goal directional information.

20. The autonomous apparatus of claim 19, wherein the one or more pretext tasks comprise one or more of a first pretext task comprising a masked patch reconstruction task between image pairs of goal images and masked observation images and a second pretext task comprising relative pose estimation between the observation image and the goal image and a visibility prediction.

21. The autonomous apparatus of claim 20, wherein one or more layers of the binocular encoder or decoder are adapted by one or more adaptors.

22. The autonomous apparatus of claim 19, wherein one or more layers of the binocular encoder or decoder are adapted by one or more adaptors.

* * * * *